(12) United States Patent
Tomassone et al.

(10) Patent No.: US 11,069,890 B2
(45) Date of Patent: Jul. 20, 2021

(54) HOLLOW PARTICLES FORMED FROM 2-DIMENSIONAL MATERIALS

(71) Applicant: Rutgers, The State University of New Jersey, New Brunswick, NJ (US)

(72) Inventors: Maria S. Tomassone, North Brunswick, NJ (US); Kurt B. Smith, Piscataway, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 43 days.

(21) Appl. No.: 16/306,354

(22) PCT Filed: May 31, 2017

(86) PCT No.: PCT/US2017/035208
§ 371 (c)(1),
(2) Date: Nov. 30, 2018

(87) PCT Pub. No.: WO2017/210289
PCT Pub. Date: Dec. 7, 2017

(65) Prior Publication Data
US 2019/0326592 A1    Oct. 24, 2019

Related U.S. Application Data

(60) Provisional application No. 62/343,480, filed on May 31, 2016.

(51) Int. Cl.
*C01B 32/198*    (2017.01)
*B01F 3/08*    (2006.01)
(Continued)

(52) U.S. Cl.
CPC ........... *H01M 4/366* (2013.01); *B01F 3/0819* (2013.01); *B01J 13/08* (2013.01); *B01J 13/203* (2013.01);
(Continued)

(58) Field of Classification Search
CPC . B82Y 40/00; B82Y 30/00; B22F 1/02; B22F 9/24; B22F 2302/40; B22F 1/0062;
(Continued)

(56) References Cited

U.S. PATENT DOCUMENTS 8,476,510 B2    7/2013 Swager et al.
2010/0059449 A1*  3/2010 Grass ..................... B03C 1/015
                                                                 210/695
(Continued)

FOREIGN PATENT DOCUMENTS

CN    102343239 A    2/2012
CN    103537236 A    1/2014
(Continued)

OTHER PUBLICATIONS

Ye, Shibing, "Core-shell-like structured graphene aerogel encapsulating paraffin: shape-stable phase change material for thermal energy storage", 2015, Royal Society of Chemistry, 3, 4018-4025 (Year: 2015).*

(Continued)

*Primary Examiner* — Imran Akram
(74) *Attorney, Agent, or Firm* — Fox Rothschild LLP

(57) ABSTRACT

The present invention relates to methods of fabrication of hollow shells/spheres/particles, core-shell particles and composite materials made from these particles.

16 Claims, 14 Drawing Sheets

(51) Int. Cl.
  B01J 13/08    (2006.01)
  B01J 13/20    (2006.01)
  H01M 4/36     (2006.01)
  H01M 4/48     (2010.01)
  B82Y 30/00    (2011.01)
  B82Y 40/00    (2011.01)
  H01M 4/02     (2006.01)

(52) U.S. Cl.
  CPC .......... *C01B 32/198* (2017.08); *H01M 4/483* (2013.01); *B82Y 30/00* (2013.01); *B82Y 40/00* (2013.01); *C01B 2204/04* (2013.01); *C01B 2204/22* (2013.01); *C01P 2002/01* (2013.01); *C01P 2004/03* (2013.01); *C01P 2004/34* (2013.01); *C01P 2006/40* (2013.01); *H01M 2004/021* (2013.01); *H01M 2004/027* (2013.01)

(58) Field of Classification Search
  CPC .. C01B 32/198; H01L 29/1606; H01M 4/133; H01M 4/1393; H01M 4/583; H01M 4/625
  See application file for complete search history.

(56) References Cited

U.S. PATENT DOCUMENTS

| | | | | |
|---|---|---|---|---|
| 2010/0303706 | A1* | 12/2010 | Wallace | B82Y 40/00 423/445 B |
| 2012/0034442 | A1* | 2/2012 | Pauzauskie | C01B 32/184 428/219 |
| 2012/0322917 | A1* | 12/2012 | Alcazar Jorba | C01B 32/23 523/468 |
| 2013/0133925 | A1* | 5/2013 | Kim | H01B 1/24 174/126.4 |
| 2013/0200302 | A1* | 8/2013 | Miller | C23C 16/26 252/182.32 |
| 2014/0329150 | A1* | 11/2014 | de Guzman | H01M 4/366 429/231.8 |
| 2014/0356721 | A1* | 12/2014 | Zhou | H01M 4/5815 429/231.4 |
| 2015/0246816 | A1* | 9/2015 | Liu | C01B 32/05 216/39 |
| 2015/0364227 | A1* | 12/2015 | Tai | B22F 9/24 428/221 |
| 2016/0043384 | A1* | 2/2016 | Zhamu | H01M 4/366 429/231.4 |
| 2016/0194207 | A1* | 7/2016 | Bassani | H01L 51/5203 423/448 |
| 2016/0376199 | A1* | 12/2016 | Koep | C04B 35/64 507/271 |
| 2017/0087519 | A1* | 3/2017 | Fortner | B82Y 30/00 |

FOREIGN PATENT DOCUMENTS

| | | | |
|---|---|---|---|
| CN | 103752234 | A | 4/2014 |
| CN | 103924198 | A | 7/2014 |
| CN | 105505330 | A * | 4/2016 |
| WO | 2013056074 | A1 | 4/2013 |

OTHER PUBLICATIONS

Gudarzi, et al: "Self Assembly of Graphene Oxide at the Liquid-Liquid Interface; A New Route to the Fabrication of Graphene Based Composites", Soft Matter, Feb. 15, 2011, vol. 7, pp. 3432-3440.

Kim, et al: "Graphene Oxide Sheets at Interfaces", Journal of the American Chemical Society, May 19, 2010, vol. 132, No. 23, pp. 8180-8186.

Wu, et al: "Janus Graphene Oxide Nanosheets Prepared Via Pickering Emulsion Template", Carbon, May 29, 2015, vol. 93, pp. 473-483.

Guo, et al: "Hollow Graphene Oxide Spheres Self-Assembled by W/O Emulsion", Journal of Materials Chemistry, Apr. 30, 2010, vol. 20, pp. 4867-4874.

Li, et al: "Introduction to Materials", Eds., China Light Industry Press, p. 161, Jun. 2013.

* cited by examiner

HOLLOW PARTICLES FORMED FROM 2-DIMENSIONAL MATERIALS

CROSS-REFERENCE TO RELATED APPLICATIONS

This application claims priority under 35 U.S.C. § 119(e) to U.S. Provisional Patent Application Ser. No. 62/343,480, filed on May 31, 2016, which is hereby incorporated by reference in its entirety.

FIELD OF THE INVENTION

The present invention provides novel methods of fabricating hollow shells comprising graphene oxide and applications thereof.

BACKGROUND OF THE INVENTION

In recent years graphene oxide (GO) and reduced graphene oxide (rGO) have been the focus of an intense research effort to exploit the unique properties of these materials. It was only relatively recently that graphene was described in the literature as the first 2-dimensional material, physically isolated as individual sheets. Graphene oxide was then subsequently understood to be molecularly thin, two-dimensional sheets of remarkably high aspect ratio, which might be chemically reduced to graphene or modified to other 2-dimensional materials. While GO itself is not a new material, the discovery of graphene and the realization of the true nature of GO at the molecular level, has prompted a continuous stream of research efforts to exploit the properties of this material.

Graphene oxide membranes and reduced graphene oxide membranes, therefore, have an enormous potential to increase the resiliency and strength of particles, hollow containers, and microstructured materials. However, for these purposes very thin membranes must be formed. A need exists for the development of a new method of producing GO materials at the micron and sub-micron scale.

SUMMARY OF THE INVENTION

The present invention meets such a need. Described herein is a method of producing hollow shells or membranes of GO at the micron, and sub-micron scale with thin (e.g. ~3 to 25 nm) GO membranes. An oil phase and an aqueous phase can be stabilized in for example a Pickering type emulsion using graphene oxide as the stabilizing agent. When these emulsions are subsequently cooled they produce stable suspensions of a solid oil phase wrapped in graphene oxide membranes. Proper adjustment of the processing parameters can achieve control over the size of the templated membranes and the thickness of the graphene oxide layer. Hollow graphene oxide shells/membranes are formed after sublimation of the cores. These very thin shells may be vastly more useful in applications which require high specific surface areas, and provide greatly decreased diffusion resistances in electrochemical applications. It is a directed self-assembly process in the sense that, although the membrane of GO spontaneously forms upon the interface between the oil phase and aqueous phase, energy input (sonication, rotor-stator, high pressure homogenization, or energetic stirring) is required to finely divide the phases and create the interfacial area.

The method of producing graphene oxide shells generally include the following steps: (a) admixing an organic removable substance in an aqueous solution which contains graphene oxide; (b) emulsifying the aqueous solution to form and oil-water emulsion which also leads to graphene oxide shells coating the removable substance; and (d) removing the removable substance from the shells. The removable substance can be a solid at room temperature, a gas at room temperature or a liquid at room temperature. Depending on the physical form of the removable substance, steps (a) and (b) can involve cooling and/or pressuring the solution to liquefy the substance when it is a gas at room temperature and then step (c) involves warming up or de-pressuring the solution to release the gas. Alternatively, steps (a) and (b) can involve heating the solution to melt the substance when it is a solid at room temperature and then step (c) involves heating or sublimation after the formation of the shell. Examples of the removable substance include naphthalene, 9-flourenone, and paraffin. The ratio between the removable substance and the graphene oxide ranges from about 5000:1 to about 1:100 by weight.

The formation of the emulsion is promoted with for example a rotor or a sonicator. The temperature of the emulsion is maintained above the melting point of the removable substance. In some embodiments, the temperature of the emulsion ranges from about 90° C. to about 100° C.

The method can further include mixing graphene oxide shells with an aerogel matrix material. In some embodiments, the aerogel matrix material is resorcinol formaldehyde (RF).

The concentration of the graphene oxide in the emulsion or the aqueous solution ranges from about 20 ppm to about 5000 ppm. In some embodiments, the concentration of the graphene oxide ranges from about 40 ppm to about 4000 ppm.

The characteristics of the graphene oxide impacts the properties of the resulting shell. In some embodiments, the graphene oxide comes from graphene oxide sheet having a lateral mean size of between about 0.5 µm to about 4 µm.

Acidity can also impact the properties of the resulting shell. In some embodiments, the aqueous solution or the emulsion is acidified. In some embodiments, the pH ranges from about 1 and about 5.

Another aspect of the invention provides a graphene oxide shell formed substantially of graphene oxide. The graphene oxide shell has a mean diameter of between about 0.2 µm to about 100 µm and a mean shell thickness of between about 1 nm to about 40 nm. In some embodiments, the mean shell thickness is between about 3 nm to about 25 nm. The hollow graphene oxide membranes (HGOMs) can be filled with additional nanoparticles/microparticles to form a composite or core/shell particles. Such particles have potential for use in drug delivery and energy storage applications, such as in lithium ion batteries.

Loading of these shells/membranes with nanoparticles allows the structures (HGOMs) to be used as nanoparticle carriers. Such core-shell structures have important applications. The combination of materials allows for multifunctional materials to be produced with tuned properties. Changing the thickness or chemical nature of the membrane shell can greatly modify the properties of the core-shell system. For example, the reactivity of the core can be decreased, the dispersibility modified, thermal stability altered, or release of the core nanoparticles can be controlled. These properties, which are derived from the core-shell structure, lead to applications in catalysis, energy storage, and biomedical drug delivery applications.

These and other aspects of the present invention will be described in greater detail below.

BRIEF DESCRIPTION OF THE DRAWINGS

FIG. 10(a) shows in the SEM image the nanoparticles inside a HGOM particle which were cut open. FIG. 10(b) shows in the corresponding TEM image the Silicon nanoparticles trapped inside the HGOM particle.

FIG. 16(a) shows GO sheets used to make the larger HGOM particles obtained with a rotor-stator are of the order of a few micrometers in lateral size as seen in the SEM images. FIG. 16(b) shows bar graph of the surface area as a function of the lateral size of the GO sheets used to produce the HGOM with a rotor-stator. The lateral mean size of the GO sheet is on the order of 4.0 μm. FIG. 10 (C) shows SEM images of the GO sheets used to make HGOM through sonication are submicrometer in size. FIG. 10 (D) shows Bar graph of the surface area as a function of the lateral size of the GO sheets used to make HGOM through probe sonication as evaluated by analysis of the SEM images. The lateral mean size is on the order of 0.52 μm.

DETAILED DESCRIPTION OF THE INVENTION

Figure 1:
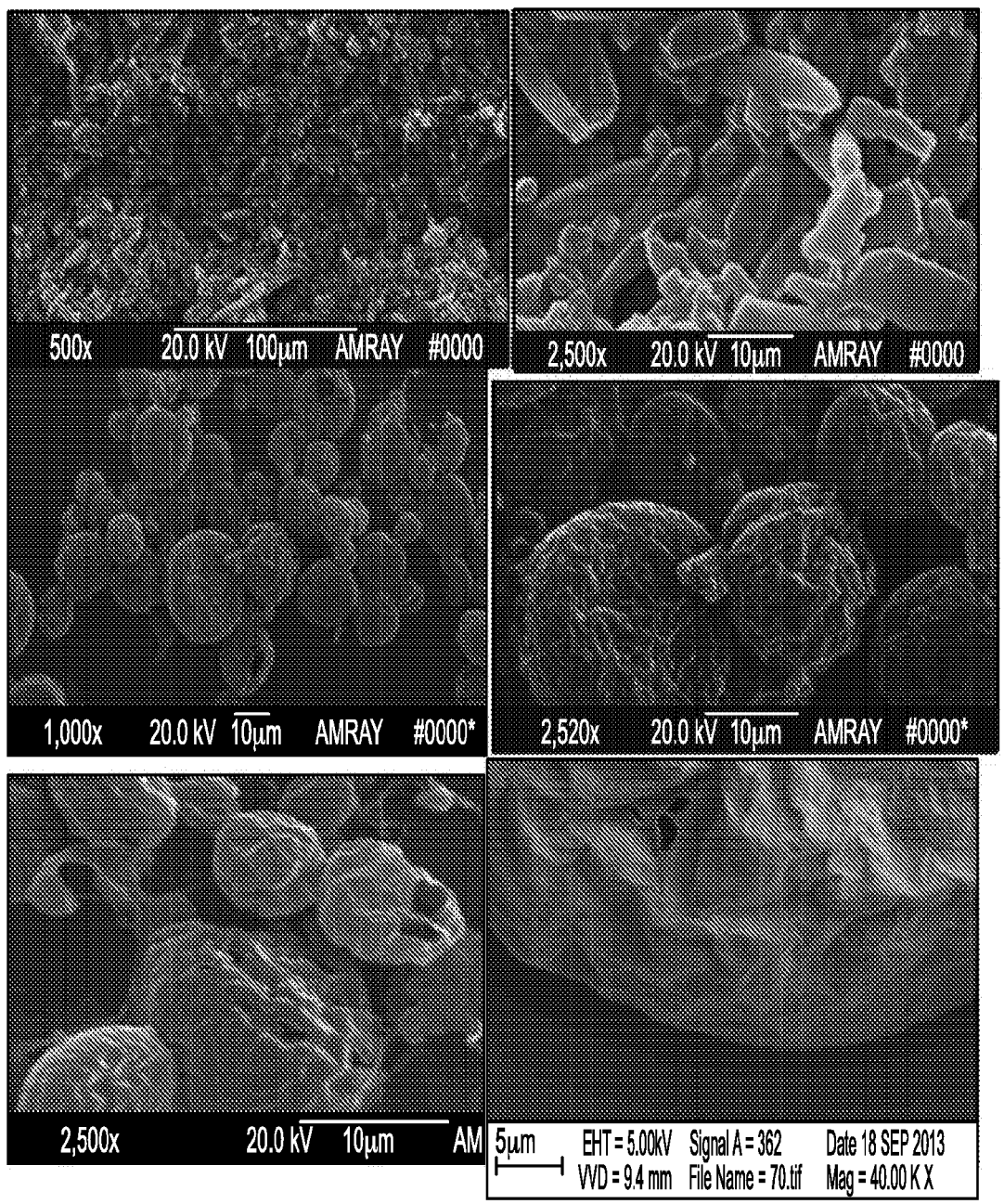
FIG. 1 shows SEM images of needles of 9-fluorenone stabilized by graphene oxide. The middle and lower SEM images show hollow graphene oxide spheres that were templated by this method in which the core material (naphthalene) was subsequently removed through sublimation leaving behind only the shell of graphene oxide.

Various embodiments of the present invention provide a novel method of producing graphene oxide (GO) shells/membranes. The GO shells find applications in fields such as air purification, supercapacitors, and core-shell structures for use in catalysis and battery electrodes.

While the following text may reference or exemplify specific components of a device or a method of utilizing the device, it is not intended to limit the scope of the invention to such particular references or examples. Various modifications may be made by those skilled in the art, in view of practical and economic considerations, such as the concentration of graphene oxide and the shear rate for forming emulsion.

The articles "a" and "an" as used herein refers to "one or more" or "at least one," unless otherwise indicated. That is, reference to any element or component of the present invention by the indefinite article "a" or "an" does not exclude the possibility that more than one element or component is present.

The term "about" as used herein refers to the referenced numeric indication plus or minus 10% of that referenced numeric indication.

The term "room temperature" as used herein include for example from about 0° C. to about 35° C., from about 10° C. to about 30° C., and from about 15° C. to about 25° C.

In the last five years there have been a number of studies characterizing graphene oxide coatings. For example, graphene oxide has been utilized to wrap solid particles, in some cases with multiple layers, but without obtaining hollow particles (free standing hollow structures). Other studies have demonstrated the spontaneous formation of thin monolayer or double layer films of graphene oxide, and while this captures the imagination, little systematic exploration of this potentially useful phenomenon has been documented. The model for self-assembly previously reported under these conditions assumed that only single or few layers self-assemble and additional stacking of graphene oxide sheets was unfavorable. This is in contrast with the present invention, in which multiple layers of graphene oxide self-assemble into thin membranes under conditions that are easily attainable in the laboratory.

The use of GO as a stabilizer for oil in water emulsions has been previously studied. When graphene is oxidized to GO, oxygen is incorporated into the structure, resulting in carboxyl groups and hydroxyl groups attached to the carbon backbone of the sheets. This makes the GO much more hydrophilic, enough so that it is dispersible in water. At neutral pH, some of the hydrogen in the carboxyl groups (and to a lesser extent the hydroxyl groups) disassociate as hydronium ions producing a negative surface charge on the graphene oxide sheets. Decreasing the pH removes this surface charge and decreases the hydrophilic nature of the GO sheets. Thus, the hydropilicity of the GO sheets can be controlled by varying the pH of the aqueous phase. In addition, the basal plane is mainly a network of un-oxidized hydrophobic benzene rings. Hence, GO can have both hydrophobic and hydrophilic areas (and edges) on each sheet, making GO amphiphilic; this characteristic is also controlled by varying the pH. Since GO is composed of small 'solid' particles, it has the potential to act both as an amphiphilic emulsifier and as a stabilizer in a Pickering emulsion. In a Pickering emulsion small solid particles adsorb at the interface between two non-miscible liquids. For particles with intermediate wettability of the two phases, there tends to be large free energy of adsorption, which for some systems yields highly stable emulsions in which the adsorption of particles at the surface is effectively irreversible. This is in contrast to conventional amphiphilic small molecule surfactants, which partition in rapid equilibrium between the bulk phases and the interface.

Furthermore, graphene oxide can easily be thermally or chemically reduced to a more highly conductive "reduced graphene" oxide (rGO), sometimes referred to as reduced graphene oxide. This high conductivity is a valuable attribute in electrical and electrochemical applications such as supercapacitors and lithium ion batteries. It has been reported that graphene oxide layer may form relatively thick walled 'containers. However, until the present invention there has not been any substantial exploration of free standing hollow graphene oxide structures constructed of very thin shells/membranes.

The present invention provides a novel method using a modified emulsion precipitation method to fabricate thin lightweight hollow graphene oxide membranes (HGOM) and hollow graphene oxide membranes which are loaded with nanoparticles (HGOM-X). The output achieved by this synthesis approach is controlled by physical parameters such as the amount of starting material, the pH, the hydrophobicity of the emulsion phases and the shear rate. By controlling this parametric space the properties of these structures can be engineered to meet specific requirements. Graphene oxide is templated on a material which may be sublimed, leaving hollow graphene oxide shells/membranes. These shells or membranes do not collapse and remain stable after the core template is removed, and even more, very thin membranes, if desired, can be obtained without deformation. To utilize these hollow spheres for applications of drug delivery, catalysis, and electrochemical applications, the shell thickness can be modified as needed.

Accordingly, the present invention provides a method of producing graphene oxide shells comprising the steps of:
(a) admixing an organic removable substance in an aqueous solution which contains graphene oxide;
(b) emulsifying the aqueous solution to form and oil-water emulsion which also leads to graphene oxide shells coating the removable substance; and
(d) removing the removable substance from the shells.

The substance can be a solid at room temperature, a gas at room temperature or a liquid at room temperature. In some embodiments, the removable substance is a solid at room temperature and can be readily removed from the shell by suitable means such as heating, degradation, dissolution and sublimation. Examples of the substance in liquid form at room temperature include toluene and benzene. Preferably, the removable substance is allowed to solidify after the emulsifying step and sublime. Examples of the sublimable substances include naphthalene and 9-fluorenone. In some embodiments, the removable substance consists essentially of a sublimable substance. Sublimation results in the formation of hollow graphene oxide membranes or shells (HGOM). However, additional materials, additives, or nanoparticles can be admixed with the removable substance depending on the desired application of the product. While the substance may sublime at the end of the process, the removal can also be achieved by dissolving the removable substance cores in an appropriate water miscible solvent, freezing the solvent, and then subliming the frozen solvent. This avoids the last step of subliming the cores in a separate step, but requires diffusion of the solvated core material from the gel, while still in the liquid phase.

Naphthalene can be made to crystallize in thin platelets. Spherical emulsion droplets are generally formed when crystallized in the presence of GO, whereas 9-fluorenone can produce needles when the same method is applied. Therefore, where assemblies of spherical templates may be prone to sheering along a plane, assemblies of templates using 9-fluorenone with higher aspect ratio may benefit from mechanical interlocking in addition to being chemically bonded by polymers. The hollow shells are not necessarily in a spherical shape and can vary depending on the removable substance and condition of the removal.

In some embodiments, the removable substance is a liquid at room temperature. After the formation of the GO shells, the substance can be readily removed by for example flushing or flowing out on its own. The substance can also be removed by heating if the boing point is low or if the liquid is evaporative. For example, pentane can be removed by heating since its boiling point is about 36° C.

In some embodiments, the removable substance is a gas at room temperature. Steps (a) and (b) can involve cooling and/or pressuring the solution to liquefy the substance. After the formation of the GO shells, step (c) involves warming up and/or de-pressuring the solution to release the gas. For example, butane is in a liquid form below −1° C. but turns to gas form above that temperature.

The amount of removable substance and graphene oxide plays an important role in the thickness and diameters of the graphene oxide shells/membranes. The void space with core-shell particles can also be controlled by varying the oil/removable substance to nanoparticle ratio. The ratio between the removable substance and graphene oxide is from about 5000:1 to about 1:100 by weight. Non-limiting examples include about 3000:1, about 2000:1, about 1000:1, about 800:1, about 500:1, about 300:1, about 100:1, about 80:1 about 50:1, about 20:1 about 10:1, about 5:1, about 1:1 and about 1:10.

Figure 2:
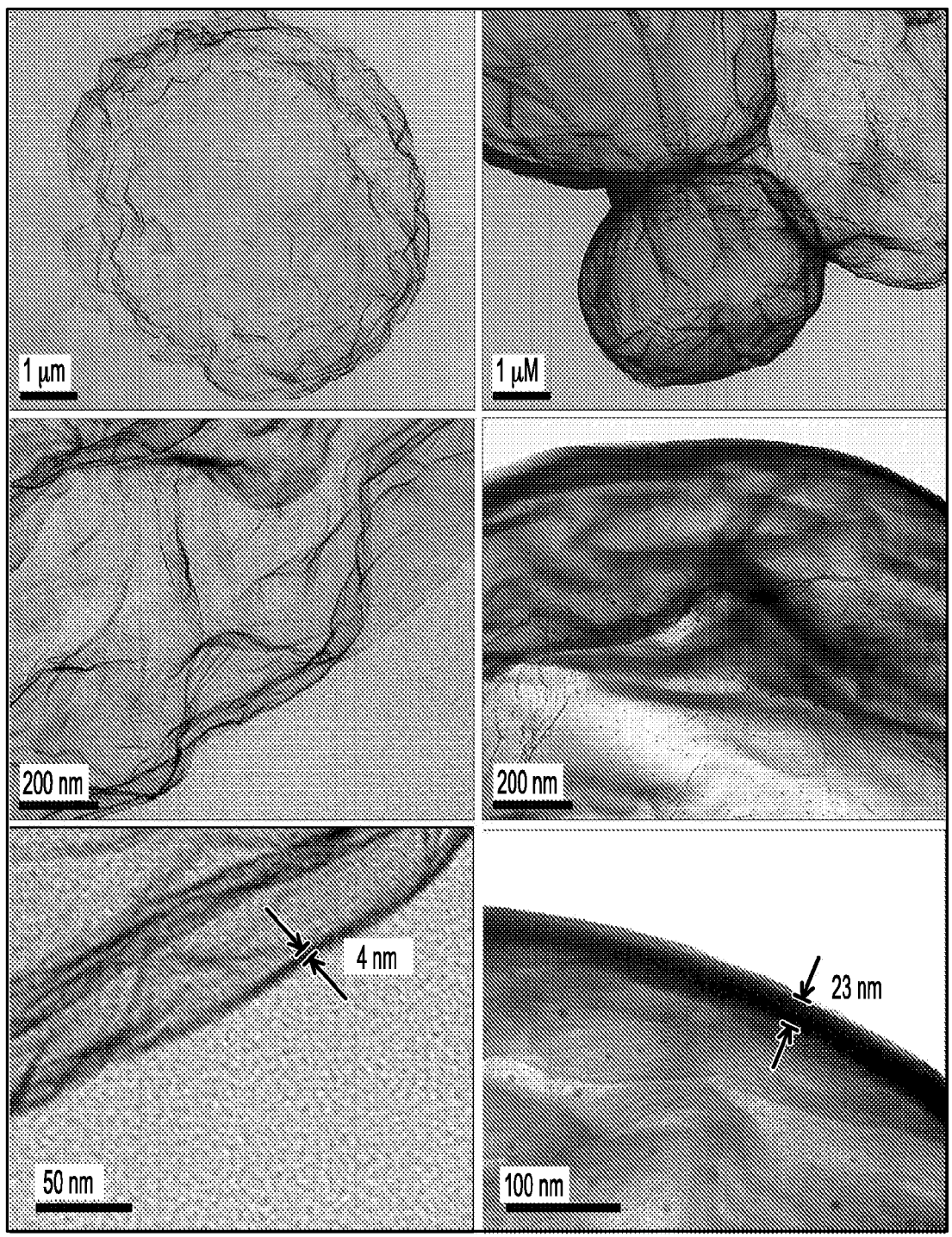
FIG. 2 shows TEM images of thin walled HGOM. Images A, B and C show TEM images are of a 'thin' walled HGOM from a suspension formed at 20 krpm 10% acetic acid and 325 ppm GO. Image C shows the HGOM with the apparent wall thickness of about 4 nm. Images D, E and F show HGOMs which were made at 20 krpm, 10% acetic acid, with 2600 ppm GO. The average calculated wall thickness for these HGOMs is 17 nm.

FIGS. 1 and 2 show TEM images of thin walled HGOM prepared by methods described herein. Not only the hollow graphene oxide spheres are readily obtained in the present invention, the thickness of the wall can also be controlled.

For example, Image C of FIG. 2 shows the HGOM with the apparent wall thickness of about 4 nm. The HGOM was prepared from a suspension formed at 20 krpm 10% acetic acid and 325 ppm GO. Images D, E and F of FIG. 2 show HGOMs which were made at 20 krpm, 10% acetic acid, with 2600 ppm GO. The average calculated wall thickness for these HGOMs is 17 nm.

As illustrated in FIG. 3(b), the concentration of graphene oxide directly impacts the thickness and diameter of the resulting shell. By selecting a desired value or range for GO concentration, the parameters of the shell can thus be readily controlled. The concentration of graphene oxide generally ranges from about 20 ppm to about 5000 ppm, all subranges and subunits included. Exemplary concentrations include about 40 ppm, about 60 ppm, about 100 ppm, about 200 ppm, about 500 ppm, about 1000 ppm, about 2000 ppm and about 3000 ppm. Additional exemplary ranges include from about 40 ppm to about 325 ppm, from about 325 ppm to about 1300 ppm, from about 1300 ppm to about 3900 ppm, from about 40 ppm to about 3900 ppm, from about 40 ppm to about 1300 ppm, from about 325 ppm to about 3900 ppm, from about 500 ppm to about 3000 ppm, from about 800 ppm to about 2000 ppm and from about 1000 ppm to about 2000 ppm.

Graphene or graphene oxide can be treated prior to being subject to the production method. For example, an acid or an oxidizing agent can be mixed with the starting material under known chemical conditions to prime the material. Hydroxyl or carbonyl, carboxylic acid, carboxyl, phosphate, amine, amide, Poly-ethylene-glycol (PEG) or other chemical groups may be introduced to GO to fine tune its physical and chemical properties.

The shell or membrane formed in this manner is made from graphene oxide, but the technique may be applicable to other 2-dimensional materials such as: 2D allotropes; graphene, graphyne, borophene, germanene, silicene, stanene, phosphorene, metals, graphane, hexagonal boron nitride, germanane, transition metal di-chalcogenides (TMDCS), molybdenum disulfide, tungsten diselenide, and MXenes.

The size of graphene oxide sheet contributes to its amphiphilicity and impacts the stabilizing effect. Because GO sheets tend to have carboxylic acid groups in the edges, so the smaller the length, the more edges they have and the more hydrophilic the GO sheets become. In some embodiments, the graphene oxide is obtained from graphene oxide sheet having a lateral mean size of between about 0.5 µm to about 10 µm. In some other exemplary embodiments, the GO sheet has a lateral mean size of between about 1 µm to about 6 µm, between about 2 µm to about 5 µm, between about 2 µm to about 4 µm, and between about 3 µm to about 4 µm. Other exemplary sizes of GO sheets used for making GO shells include about 2 µm, about 3 µm, about 4 µm, about 5 µm, and about 6 µm. The GO shells can be made with a rotor-stator or through sonication. In some embodiments, the GO shells are made from GO sheets with a lateral mean size of about 4.0 µm using a rotor-stator. In some embodiments, the GO shells are made from GO sheets with a lateral mean size of about 0.52 µm through sonication.

This process of coating the emulsion oil droplets with successive layers of overlapping graphene oxide is responsible for the resulting structures. Decreasing the pH assists in forming multiple layers of graphene oxide, since the interactions between individual graphene oxide sheets become more favorable than the interactions with the aqueous phase. Exemplary pH ranges include from about 1.5 to about 5.5, from about 2 to about 5, from about 3 to about 5 and from about 4 to about 5. Other exemplary pH values of the solution include about 2.5, about 3, about 4, about 4.5, about 5, about 5.5 and about 6. Suitable acid can be added to the aqueous solution or the emulsion to control the pH value.

The aqueous solution may be heated during the emulsifying step. In general the temperature needs to be above the melting point of the substance to be removed. Exemplary temperatures include about 60° C., about 70° C., about 80° C. and about 90° C.

The emulsifying step can be promoted by any suitable means such as rotor spinning and sonication. In case of a rotor operation, the shear rate ranges from about 1,000 to about 80,000 rpm depending on the desired characteristics of HGOM. Exemplary shear rates (in rpm) include about 2000, about 4000, about 6000, about 8000, about 10,000, about 15,000, about 20,000, about 25,000, about 30,000, about 35,000, about 40,000, about 45,000, about 50,000, about 55,000, and about 60,000 rpm.

GO shells of the present method have a thickness ranging from about 1 nm to about 40 nm, all subranges and subunits included. Exemplary ranges include from about 5 nm to about 20 nm, from about 5 nm to about 15 nm and from about 10 nm to about 15 nm. The shells also have a mean diameter ranging from about 0.2 µm to about 100 µm. Additional exemplary ranges of mean diameters include from about 0.5 µm to about 80 µm, from about 1 µm to about 50 µm, from about 3 µm to about 50 µm, from about 5 µm to about 30 µm and from about 10 µm to about 50 µm.

The present invention is also applicable in production of composites such as aerogel and cryogel systems. Systems which allow for controlled placement of thin graphene oxide membranes have not been described in the literature. Such materials have potential applications as acoustic insulation in aircraft and as thermal insulation in applications where space is limited. This higher order structure made of strong graphene oxide has the potential to reinforce these fragile materials making them useful in many additional applications, perhaps even as core materials, replacing the familiar honeycomb webbing in reinforced panels for aerospace. Aircraft weight reduction has the potential to increase fuel efficiency of passenger and cargo transport.

Additionally, these thin and ultra-thin graphene oxide membranes naturally have high surface area. One application of aerogels and cryogels is as the active material in supercapacitors, also known as electric double layer capacitors (EDLC). Supercapacitors have specific power about one order of magnitude larger than conventional batteries (lithium ion or nickel metal hydride). This has potentially great weight, cost and energy savings in many important applications, such as hybrid electric vehicles. The present invention provides higher order structural elements (microspheres) of sufficient thickness to act as reinforcing elements for these foam materials.

Accordingly, the present method may also include mixing the graphene oxide shell with an aerogel matrix material that acts as a "glue" to hold all the shells together and form a matrix. The aerogel matrix material may contain, for example, resorcinol formaldehyde (RF). Other components can be incorporated into the aerogel matrix material depending on the application of the final product.

The GO shells may also contain nanoparticles by admixing the removable substance with nanoparticles and emulsifying the mixture in the aqueous solution. The nanoparticles can thus be loaded to the interior of the HGOMs to create core shell particles. Core-shell particles have unique properties which make them valuable in many fields including energy storage applications and medicine. The general procedure to produce HGOM can easily be manipulated to incorporate additional components, such as polymers, or electrochemically active materials such as silicon nanoparticles. For example, as a drug delivery method, composite particles of drug molecules can reduce the unwanted burst effect, in which a spike of drug is released soon after administration. The nanoparticles enclosed in the GO shells can also be a catalyst. The nanoparticles can be physically entrapped in the GO shells or further linked to functional groups (e.g. carboxylic acid) of the GO shells. The present invention provides a promising utilization of these HGOM nano-carriers. Furthermore, graphene oxide can be covalently functionalized to target cancer cells with specific receptors, and GO can also PEGylated to reduce renal clearance and increase circulation times. Tuning the exterior of these HGOM core-shell drug delivery particles will thus assist in targeting disease effectively. Non-limiting examples of functional groups including hydroxyl, carboxylic acid, thiol, and amino group.

In other fields of application, silicon nanoparticles may also be incorporated inside HGOM with engineered pore space. Further, additional catalyst or electrochemically active components can be loaded into the HGOM.

Using the techniques developed herein, the hollow graphene oxide membranes (HGOMs) can be combined with additional processes to produce uncollapsed hollow membrane reinforced cryogels, a novel material, not described in the literature to date. The present invention further allows modification of theses HGOMs to create pore space in novel composite core-shell systems, in which the pore space is a critical component to the utility of these engineered materials.

The HGOM of the present invention can be incorporated into various articles of manufacture. In an exemplary embodiment, core-shell particles of the present invention consisting of hollow graphene oxide membranes (HGOM) find applications in lithium-ion batteries. Thermal reduction of the silicon/HGOM core shell particles yields highly conductive composites. Since the silicon nanoparticles have very high specific capacity, the resulting composite will also have high specific capacity, thus increasing the specific capacity of lithium-ion batteries that employ these composites.

Graphene combined with silicon has proven extremely promising for lithium ion batteries. Several advantages of these composites include: (1) graphene provides a highly conductive graphene matrix with high surface area allowing for intimate contact with silicon; (2) a nano-scaled GO matrix allows for the reduction in silicon particle size, thereby decreasing the resistance to lithium diffusion and electric currents within the silicon particles; (3) graphene is strong and flexible, accommodating the volumetric expansion which occurs as lithiation and delithiation of the electrochemically active materials occurs; and (4) fully encapsulating the electrochemically active material allows for the SEI layer to build on the stable graphene oxide surface, rather than the ever-changing state of the electrochemically active material. (5) these HGOM particles allow for the creation of microscopic batteries given the small size of these particles, since HGOM are great candidates for the creation of the microscopic electrodes of such microscopic batteries.

The present invention differs from previous approaches in two significant ways. First, agglomeration will be prevented by encapsulating the particles in shells. Other attempts have been able to utilize the flexibility of graphene and thin graphitic layers to accommodate the large volume changes of silicon. Impressively these experiments approached the theoretical limit of silicone over many cycles, but capacity loss eventually occurred. This capacity loss is in part speculated to be the result of irreversible agglomeration as the particles redistribute themselves within the loosely packed graphene/graphitic matrix. Additionally the silicon nanoparticles appear to be still in direct contact with the electrolyte, allowing for formation and re-formation of the solid electrolyte interface (SEI layer) during cycling.

The second major difference, compared with previous studies, is that the graphene shells will be 'loosely' fitted about the silicon nanoparticles. This means that when fully lithiated the silicon nanoparticles will not completely fill (or overfill) the volume of the thermally reduced graphene oxide shells. Other attempts to wrap electrochemically active material in graphene have been successful, but not with the volumetric expansion ratio required to utilize silicon. For example, the volumetric expansion of $Co_3O_4$, is able to be accommodated by rather tightly fitting shells of graphene which are directly template on the particles. But it would appear that such shells are unable to accommodate silicon's 300 percent expansion upon lithiation. Thus, the more desirable silicon anodes appears to be incompatible with the process of directly templating the shells upon the silicon cores. The present invention produces 'loosely fitted' shells, which provide both containment of the nanoparticles, and the flexibility and room for volumetric expansion during cycling. This broadly applicable method will facilitate a wide choice of active materials.

Using the HGOM described herein, electrochemically active nanoparticles can be incorporated into the cores. Then the hybrid core-shell particles are incorporated into a composite formed from the HGOM and GO in Plan A, or a cryogel/xerogel foam in Plan B. The resulting material will contain the electrochemically active nano-particles trapped inside the HGOM. Upon thermal reduction, it is known that the GO membrane is pyrolyzed to graphene and partially reconstituted graphitic phases, while the RF will also be reduced to carbon. The combination of GO and RF under thermal reduction produces high strength bonds within the graphene based structure. Therefore, this combination is very useful for trapping nanoparticles and preventing agglomeration.

The following non-limiting examples set forth herein below illustrate certain aspects of the invention.

EXAMPLES

Example 1

Graphene oxide membranes were templated in an oil in water emulsion and allowed to cool, forming particles with solid oil phase cores coated with a thin GO membrane spontaneously formed about the oil phase. Sublimation of the core material resulted in thin Hollow Graphene Oxide Membranes (HGOMs).

Synthesis of Hollow Graphene Oxide Membranes on Naphthalene Cores. Graphene oxide was used as the suspension agent or 'surfactant' in a Pickering emulsion containing water and an oil phase. In a Pickering emulsion, small solid particles adsorb at the interface between two non-miscible liquids, such as oil and water, and act to stabilize the interface. If the oil phase material is chosen such that it will solidify above room temperature (e.g., naphthalene) then upon cooling the resulting emulsion will become a suspension of graphene oxide membrane covered particles, with solid oil-phase (e.g., naphthalene) cores.

Additionally, if the oil phase is subsequently removed, only the membrane remains, yielding novel hollow graphene oxide shells or spheres with ultra-thin shells.

In a covered 150 mL tall form beaker 10 g of 0.65 wt % GO aqueous solution, 71 mL of DDI water, and 10 grams of naphthalene (m.p. 80 C) were heated in a boiling water bath, all the contents of which was also covered to provide even heating and limited evaporation of the bath. The beaker contents were brought to near boiling (approx. 98 C) in 5 minutes. The beaker was uncovered and an IKA T25 digital Ultra Turrax rotor-stator homogenizer with S 25N-25T dispersing tool (preheated in boiling water) was inserted in the beaker and the contents were emulsified at 20,000 rpm for 3 minutes. The rotating tip of the rotor-stator disperser has a high speed rotor and a closely spaced stationary element which is particularly effective at producing high shear rates, and thus fine emulsions. After the first minute of emulsification, 8.6 mL (9.0 g) of glacial acetic acid was slowly added to the beaker, over about 30 seconds. This produced a mixture, in this case, of 650 ppm GO by weight of the total mixture (corresponding to 0.65 wt % GO of the naphthalene phase), and a 10.0 wt % solution of acetic acid in the aqueous phase. The oil to total emulsion ratio was 10 wt % for this formulation. The temperature remained near boiling (approx. 98 F) throughout the emulsification process. This process produced micron-scale droplets of the liquid oil phase (naphthalene) which were coated by multiple layers of graphene oxide forming a GO membrane around the oil droplets. After a total of three minutes of rotor-stator stirring, the beaker was removed from the water bath and cooled to room temperature by placing the beaker in a room temperature water bath. As the temperature was brought below the melting point of the oil-phase naphthalene, the naphthalene droplets solidify, forming a suspension. Attempting to repeat the process without adding graphene oxide failed completely to form any kind of an emulsion, as the oil droplets coalesced as fast as they could be formed. This was the experimental procedure for the emulsion-precipitation method of creating membrane coated solidified organic particles covered with graphene oxide membranes.

In an exemplary embodiment, graphene oxide partially covered the solidified organic (oil) cores; as additional layers of GO coated the spheres, shells of many layers thick GO (e.g., 20 nm) formed on the molten cores. A suspension of solid naphthalene particles covered by GO layers form after cooling. After sublimation of the solid naphthalene phase cores (called the oil phase), hollow particles were formed. These low density hollow particles with very thin shells can be seen in the SEM images of FIG. 1. These spherical particles and those of other geometries belong to a new class of Hollow Graphene Oxide Membranes, with free standing ultra-thin shells.

Design of Experiment. The study systematically varied the concentration of the GO (which changes the GO to naphthalene ratio) and the rotostator speed. The HGOM particle size (surface area based mean) was measured by laser diffraction to characterize the particle size created under these conditions. The surface area based mean enables the calculation of the thickness of the graphene oxide membranes by mass balance. It was concluded that a robust and reliable process and materials parameter space can be produced that allows control of the properties of the HGOMs produced, namely the diameter and thickness of the HGOMs. This procedure can be extended to the sonication technique of emulsification, which tends to produce finer emulsions (smaller diameter HGOMs), and is also be applicable to the production of HGOMs when they are used as nanoparticle carriers.

Synthesis of Core shell particles and HGOM as nanocarriers. Using a probe sonicator to form an emulsion, smaller quantities and finer emulsions of Hollow Graphene Oxide Membranes were made. This included silicon nanoparticles, which find applications for lithium ion batteries, and polymer particles, which have biomedical applications as composite drug delivery agents.

Characterization. Transmission electron microscope (TEM) images were obtained using a Jeol JEM-100CX II, using copper grids. Scanning electron microscope (SEM) images were acquired using a Zeiss Sigma Field Emission SEM. SEM sample stubs were prepared by applying liquid suspensions to a mounted silicon wafer with a pipette. SEM samples were allowed to dry then vacuum desiccated and sputter coated, using a Balzers SCD 004 Sputter Coating Unit with Gold/Palladium Target (Au:Pd 60/40 ratio), prior to imaging. Additional SEM images were obtained using the Amray 1830 I scanning electron microscope. Particle size analysis was performed using a Beckman-Coulter LS-13 320 laser diffraction apparatus with a universal liquid module filled with distilled deionized water. A refractive index of 1.582 was used to define the naphthalene cored particles. The zeta potential of suspensions was measured using photon correlation spectroscopy using a Malvern Zetasizer Nano Z90 and disposable folded capillary cells. Characterization of the exfoliation of the GO sheets was performed using atomic force microscopy. AFM images were acquired with a Nanoscope IIIA (Vecco) in air in tapping mode. AFM samples were prepared by placing a drop of the dilute synthesized graphene oxide solution onto freshly cleaved mica and immediately drying under flowing argon. The pH of solutions and suspensions was measured using a double junction Oakton phTester 20 after three point calibration using NIST standards.

Chemicals and Materials. Graphene stabilized oil in water emulsions were produced using naphthalene, 9-flourenone, acetic acid, and polytetrafluoroethylene particles, which were purchased from Sigma Aldrich and used as received. No surfactants other than the graphene oxide were added to form the emulsions. The glassware and all experimental components were thoroughly washed with acetone and DDI water prior to use. Ultrapure Milli-Q water produced from the Millipore system was used as the water source throughout, including the purification of GO and as the source of water for the emulsions, as well as the final rinse water for all glassware and equipment.

Graphene oxide was synthesized by a modified Hummers method using natural flake graphite (grade 230U, Asbury Carbons, Asbury, N.J.). The modified Hummers method consists of an acidic pretreatment followed by the Hummers method as developed by Kovtyukhova and others. Briefly, the acidic pretreatment involved the addition of graphite to $H_2SO_4$, $K_2S_2O_8$, and $P_2O_5$ followed by reaction, washing with DDI (Distilled Deionized Water), and air drying. The oxidation step was achieved by slow addition of $KMnO_4$ to the preoxidized graphite in $H_2SO_4$ in an ice bath, followed by reaction, the careful addition of water and then the addition of $H_2O_2$. After separation the GO was purified by filtration, washing with an HCl solution and then DDI water. The GO was further purified by washing an additional 10 times with DDI.

Figure 3:
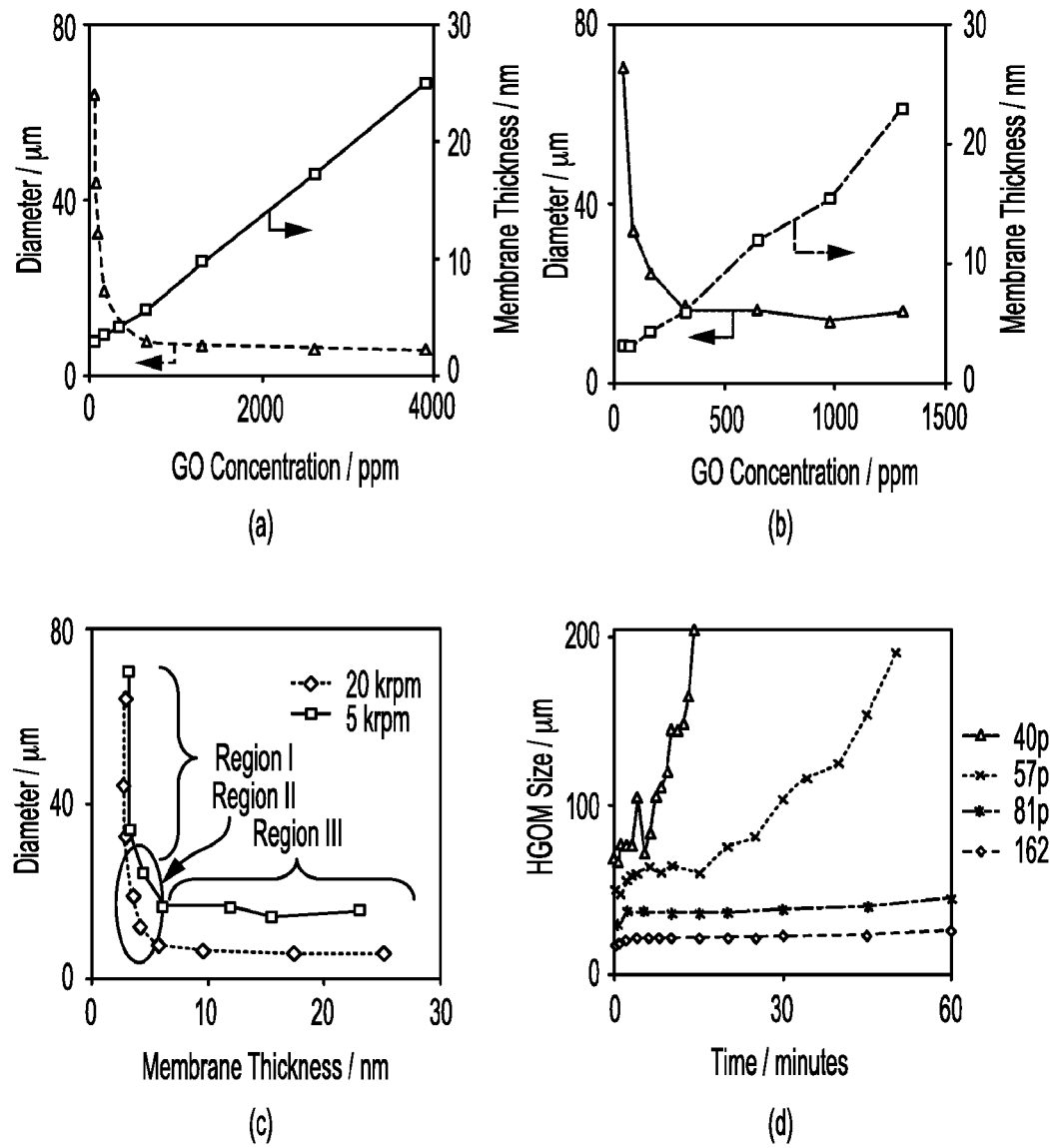
FIG. 3 shows plots of mean size using particle surface area based distribution, and calculated mean membrane thickness based on mass balance formed at various GO concentrations: A) HGOM formed by rotor-stator at 20,000 rpm, and B) at 5,000 rpm. C) Plot of the HGOM diameter to membrane thickness at two different rotor-stator speeds. D) Plot of the stability of emulsions formed at various GO concentrations.

The experiments varied the shear from 5,000 to 20,000 rpm with a Rotor-stator and also varied systematically the concentration of the GO but kept the naphthalene concentration and aqueous phase (water and acetic acid) concentration constant. The results are shown in FIG. 3. FIG. 3a shows the diameter (left y-axis) and the membrane thickness (right y-axis) of the templated HGOM as a function of GO concentration at a fixed rotor-stator speed of 20,000 rpm. The diameter of the HGOM decreases as additional GO is added. This is due to the stabilizing amphiphilic nature of GO explained earlier. At high GO concentrations (above 650 ppm) the HGOM becomes nearly constant reaching a plateau for sizes of the order of 6-8 The membrane thickness increases in what appears to be a nearly linearly trend with increasing GO concentrations. Stable emulsions could not be produced below a GO concentration of approximately 40 ppm, producing a naphthalene to GO weight ratio of approximately 2500:1. At this limit the membrane thickness is approximately 3 nm. In FIG. 3b we observe the same trends for a lower rotor-stator speed of 5,000 rpm. A minimum HGOM size plateau is reached with increasing GO concentrations after 500 ppm, although this occurs at larger HGOM sizes (16 μm) than at 20,000 rpm. The lower limit of stable emulsions was again approximately 40 ppm GO, and this concentration again produced membranes which were also approximately the same minimum thickness of approximately 3 nm.

A very interesting trend was observed when the resulting properties were mapped onto a plot as shown in FIG. 3c with two plots, one for 5000 rpm and another for 20,000 rpm. Using the relationship between membrane thickness and diameter, we can distinguish three distinctive regions in the diameter of HGOM particle and thickness of membranes produced. At sufficiently low GO to naphthalene concentrations, the membrane thickness was constant and at sufficiently high GO concentrations, the diameter was constant. In particular in this figure we observe that at 20,000 rpm, there are three regions: Region I (40 to 325 ppm), Region II (325 to 1300 ppm), and Region III (1300 to 3900 ppm). Region I consists of particles with nearly constant GO membrane thickness and varied particle diameter. Increasing the GO concentration by 300% (from 40 to 162 ppm) results in an increase of only a 21% in membrane thickness (from 2.9 nm to 3.5 nm). In region I we observed that for a membrane thickness of 3 nm there is only about 3 or 4 layers of GO (i.e. assuming an inter-layer spacing of 0.8 nm as typically reported by XRD for filtration formed GO membrane samples). This region is dominated by emulsion droplets coalescing, a thermodynamically favorable process. Region II consists of a transition region in which the GO concentration affects both membrane thickness and particle size. Region III is a region in which increasing the GO concentration does not appreciably change particle size but it does change membrane thickness (i.e., in this region increasing the GO concentration has almost a 1 to 1 ratio of increasing the membrane thickness). In region III, at 20,000 rpm, increasing the GO concentration from 1300 ppm to 3900 ppm, (i.e. a 200% increase in concentration), results in a slight reduction of approximately 13% in particle size and a 160% increase in membrane thickness. A similar three region trend was observed at 5,000 rpm, but coarser emulsions were produced in Region III at these lower shear rates. Almost the exact same lower limit in membrane thickness was achieved in Region I for the two shear rates.

FIG. 3d shows the behavior of the emulsions obtained in Region I in more detail. This ultrathin membrane region was further explored by measuring the stability of the emulsions. (i.e. the size of HGOM particles as a function of time). For this experiment, rather than quenching the emulsion to form a suspension, the emulsion was kept at 98° C. for a prolonged period. The size of the emulsion particles/droplets increased rapidly or hardly at all. The stability of HGOM in the emulsion phase became increasingly better for GO concentrations higher than 81 ppm.

Figure 4A:
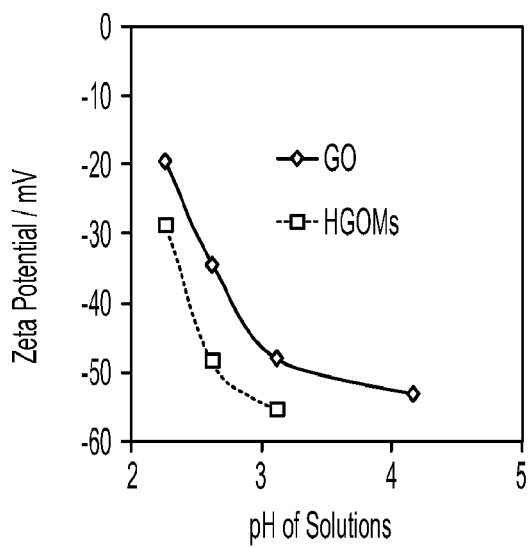
FIG. 4(a) shows the zeta potential of both GO and HGOMs measured at various pH conditions.

To understand this interaction of the GO at the surface of the oil droplets, the zeta potential was measured for the GO and HGOM suspensions at different pH conditions. FIG. 4(a) shows the relationship of pH to zeta potential. The combination of favorable interaction between the GO platelets at the surface of the oil phase, and reduced interaction with the water phase, greatly favors stacking into thin membranes. This was in part accomplished by control of the zeta potential of the graphene oxide platelets. Acid was added to create a series of GO solutions of decreasing pH. In FIG. 4(a) it could be seen that decreasing the pH of the solution produces GO platelets of ever decreasing net charge.

Figure 4B:
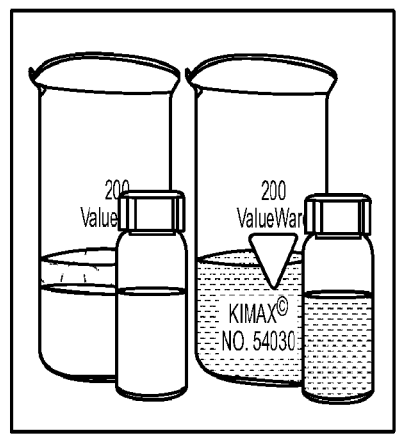
FIG. 4(b) shows the comparison of HGOM suspension with a system of graphene oxide.

If a coarse emulsion with large particles is made, the HGOM particles will settle over the course of a few hours. FIG. 4(b) is a digital image showing the separation of the precipitate from the supernatant. The left beaker contains the HGOM suspension, after the HGOM particles have settled; the left vial is a sample of the supernatant. The HGOM have settled to the bottom of the beaker, which the remaining supernatant liquid can be seen above the HGOM particles. For comparison, the right beaker contains a dark solution of only GO at the same initial concentration. The transparent, nearly colorless, supernatant from the HGOM contains almost no GO. Quantitative analysis by UV-vis spectroscopy indicates that he supernatant in the left beaker contains less than 10% of the original GO, with more than 90% on the suspension particles. Surprisingly, the HGOM may be washed on a filter with distilled water without release of the GO from the solid oil phase cores.

Figure 5:
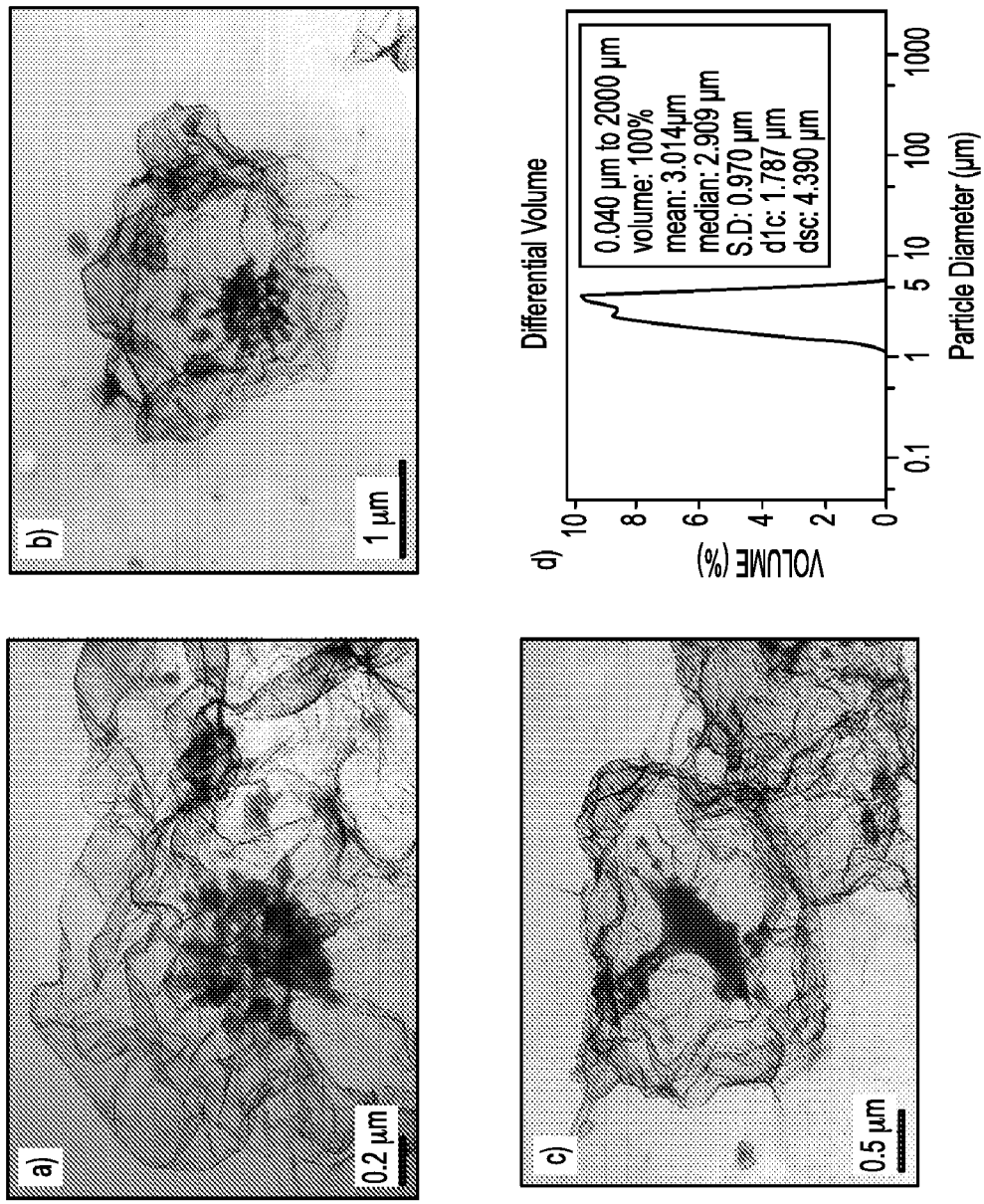
FIGS. 5(a)-(c) show TEM images of the darker submicron polymer (PTFE) particles, loaded into the interiors of the HGOM, whose application includes drug delivery where nanoparticles or sub-micron polymer particles are loaded with drug.
FIG. 5(d) shows plot of the size distribution of the encapsulated HGOM-PTFE particles produced through sonication.

Core-Shell Graphene Oxide Membranes. Sub-micron polytetrafluoroethylene (PTFE) particles were incorporated into the oil phase (naphthalene), before HGOM formation. Upon sublimation of the oil phase (naphthalene), the PTFE particles remain within the graphene oxide shells, producing HGOM-PTFE composite core shell particles. The darker PTFE particles can be seen within the GO membranes in the TEM images of the resulting composite core shell particles as shown in FIG. 5. The resulting histogram of the HGOM-PTFE particle diameters was determined by laser diffraction. The results show that 80% of the volume is contained within the HGOMs of diameters between 1.8 and 4.4 microns, with essentially no particles larger than approximately 6 microns. The mean size is 3.0 microns."

Example 2

As an example using naphthalene templated graphene oxide membranes and resorcinol formaldehyde (RF) chemistry: Graphene oxide templated membranes were washed with DDI water on a Buchner funnel to remove any additives used in processing the template membranes (such as acetic acid used to adjust pH). Resorcinol and formaldehyde were mixed in a 1:2 molar ratio with sodium carbonate catalyst (with a Resorcinol to catalyst molar ratio of 200:1). The pre-gelled mixture was aged for a period of time at room temperature to nucleate the sol-gel, but short of producing a gelled material (e.g., 20 percent solids (R+F) aged for 24 hrs. at 20 C). The pre-gelled mixture was added to the graphene oxide template membranes (still containing cores) and mixed. For highly viscous mixtures (due to particle size or concentration) air bubbles may be removed from the mixture by centrifuging, but at accelerations several magnitudes below that required to concentrate graphene oxide in aqueous solutions. For mixtures in which air-entrapment is not an issue the centrifuge step is unnecessary. The mixture is place in tightly sealed glass vials and aged at temperatures below the melting point of the oil phase cores (naphthalene templated membrane based—RF foams are aged at 65 C).

Figure 6:
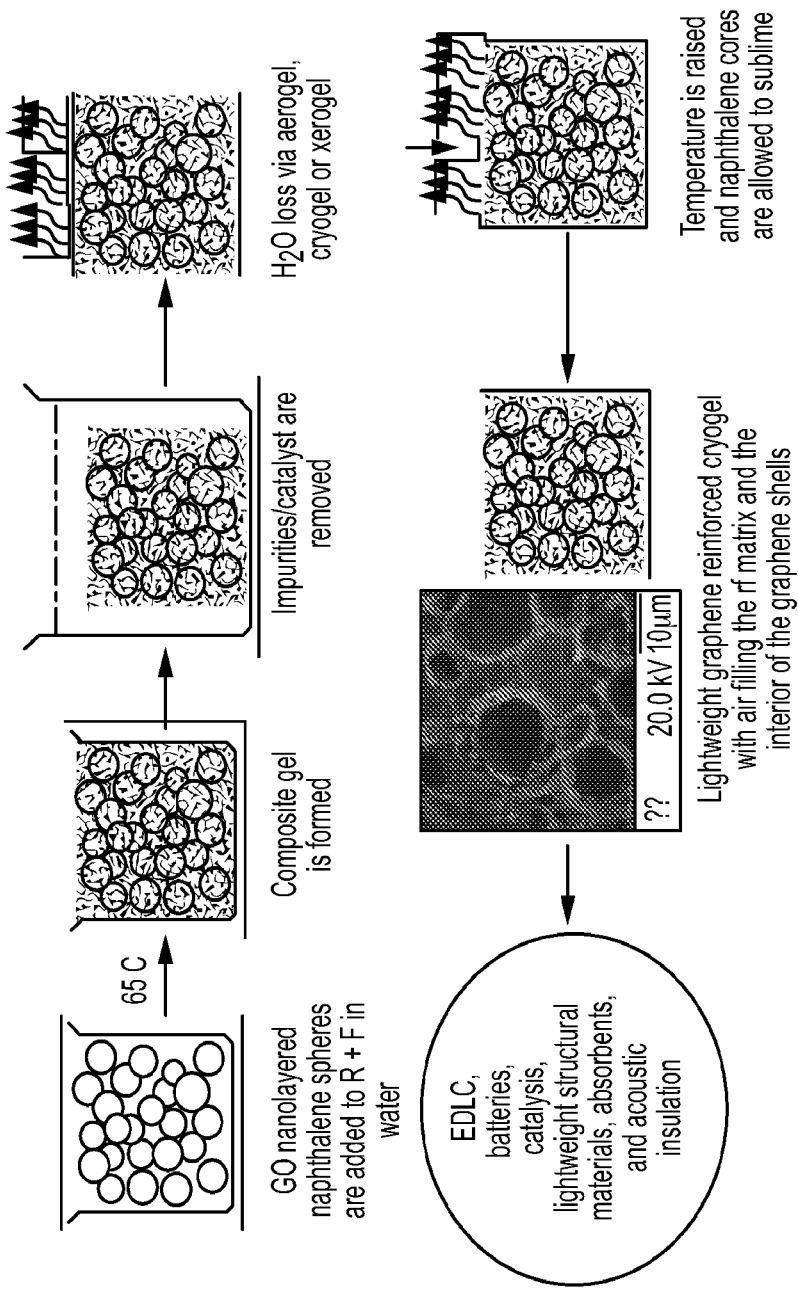
FIG. 6 shows the experimental steps to produce composite RF-HGOM cryogel foam starting clockwise from the upper left corner. The SEM microscopy picture at the bottom is a cross section of an actual composite showing the internal structure with hollow graphene oxide membranes.

FIG. 6 shows the process with the oil-phase cores composed of naphthalene and the cryogel matrix material composed of resorcinol formaldehyde (RF), a well-known and experimentally mature chemistry for organic aerogels and cryogels.

Additional template geometries can be developed. For example, 9-fluorenone can be used as the core material of the HGOM particles to produce rod or needle templated hollow membrane composite structures. Since the melting points of naphthalene and 9-fluorenone are nearly identical, (80 C to 83 C), similar processing temperatures can be used to set the RF gel without melting the HGOM cores. Removal of the cores may be through sublimation, however the vapor pressure of 9-fluorenone is somewhat lower than naphthalene, making this route less attractive, though not intractable. As an alternative, the HGOM cores can be removed by dissolving the cores in an appropriate water miscible solvent, freezing the solvent, and then subliming the frozen solvent. This avoids the last step of subliming the cores in a separate step, but requires diffusion of the solvated core material from the gel, while still in the liquid phase.

The procedure can be modified to include additional chemistries. For a water based epoxy formulation: triethylenetetramine hydrate (98%) and 1,4-butanediol diglycidyl ether (95%) were mixed in a 3:1 molar ratio which provides a molar 1:1 ratio between amine protons and epoxide rings. The general procedure is similar to that described above for GO-RF gels, except that the formulation of the aerogel and curing times and temperatures will change to meet the requirements for this chemistry.

Figure 7:
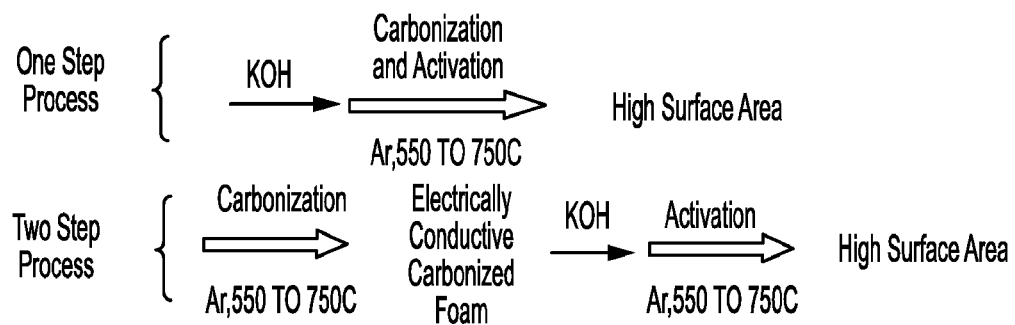
FIG. 7 shows the process of producing high surface area GO-RF carbonized foam samples for EDLC.

The GO-RF foam samples were activated with potassium hydroxide which partially oxidizes and roughness the surface, thus increasing the surface area, for use as EDLC or supercapacitors. This is done either in a one-step process or a two-step process as shown in FIG. 7.

These samples exhibit a much higher modulus of elasticity than samples without the hollow graphene oxide microspheres. Even with low levels of graphene oxide reinforcement (3 mg/mL in the formulation), the samples exhibit little or no visible compression up to the greatly enhanced crushing strength of approximately 70 psi (0.5 MPa). Adding to the utility of the process, the foam may be cast into nearly any shape, or cut to exact specifications after casting. For example, a GO-RF foam sample was initially cast as a cylinder, which was then cut in the dry state after casting. Machining and/or grinding before water/naphthalene removal is also a possibility.

Table 1 shows experimental results of various compositions produced by this process: the weight percent graphene oxide comprising the 'solids' (GO+RF) in the sample formulation; the total density/concentration of 'solids' in the sample formulation (GO+RF); and the final density of the dried foam composite in which the standard error of the mean has been propagated from the sample dimension measurements (diameter and length).

TABLE 1 preliminary results of a narrow range of densities
Properties of GO - RF Composite Foams Samples

| GO wt % solids | mg/mL solids | mg/mL |
|---|---|---|
| 29.3 | 56.0 | 81.3 ± 0.3 |
| 38.4 | 51.7 | 77.1 ± 0.2 |
| 41.3 | 42.1 | 55.8 ± 0.2 |
| 46.4 | 35.4 | 52.3 ± 0.2 |

The characteristics of a GO-RF foam sample made as a composite from hollow graphene oxide spheres and resorcinol-formaldehyde resin can be illustrated with an x-ray diffraction pattern (XRD). The two peaks of the unpyrolyzed sample at 17 and 23 degrees correspond to the stacking distance of the GO sheets. Extensive heating of the sample at 65 C for two weeks and then drying the sample appears to have eliminated much of the oxides (such as carboxyl and hydroxyl groups) to allow close spaced stacking of at least a portion of the GO/Graphene foam sample. The typical graphene oxide peak at 8 to 12 degrees was eliminated due to the extended processing conditions through reduction or dehydration of the water trapped between the graphene oxide sheets. RF may have impregnated between sheets and eliminated long range order of stacking for the peak that would be expected. The peak at 43 degrees is the GO/Graphene 110 peak. The designation of diffraction pattern peaks for graphene and graphene oxide follows the assignments from Physics and Applications of Graphene-Experiments.

General experimental procedures include the following: The RF-HGOM foam sample was soaked with a 5 M KOH solution and heated to 550 C under flowing nitrogen for one hour, after which the sample was washed with DDI for two days.

GO-RF foam samples (approx. 100 mg) were put into 16 mL of aqueous KOH solutions of various concentrations in a capped polyethylene bottle. The samples were dried at 120 C, transferred to a horizontal tube furnace, heated to 180 C for 1 hour, then heated to 700 C for 1 hour under flowing nitrogen at 100 mL/minute with a heating rate of 5 C/minute. The KOH to sample ratios were 2.6, 5.3, 6.9, and 9.6 for KOH solutions of 15, 27, 37, and 45 wt % KOH respectively. The pyrolyzed activated samples were soaked in 100 mL DDI water for two days to allow potassium compounds to diffuse from the activated carbonized foam. Yield upon pyrolysis was 33.2, 23.5, 12.0, and 3.4 percent, for the samples with KOH activation concentrations of 15, 27, 37, and 45 wt % KOH, respectively. The pyrolyzed but unactivated sample had a yield of 55.3 percent. The resulting surface area and pore space is summarized in Table 2.

TABLE 2

The surface area using BET theory and Langmuir adsorption isotherms for samples with different activation treatments are shown in the table. Micro (<2 nm) and meso (>2 nm) pore size distributions (surface area and volume) are calculated using non-linear density functional theory (DFT). Additionally, the total pore volume calculated by BJH is also included.
Characteristics of the Activated, Pyrolyzed, and Untreated RF-GO Foams

| Treatment (wt % KOH) | $S_{BET}$ (m²/g) | $S_{Lang}$ (m²/g) | $S_{meso(DFT)}$ (m²/g) | $S_{micro(DFT)}$ (m²/g) | $V_{meso(DFT)}$ (cm³/g) | $V_{micro(DFT)}$ (cm³/g) | $V_{BJH}$ (cm³/g) |
|---|---|---|---|---|---|---|---|
| 0% (unpyrolyzed) | 128 | 204 | 49 | 39 | 0.174 | 0.023 | 0.235 |
| 0% (pyrolyzed) | 425 | 649 | 98 | 436 | 0.398 | 0.142 | 0.607 |
| 14.6 | 1268 | 1933 | 559 | 645 | 0.179 | 0.492 | 0.738 |
| 26.6 | 968 | 1532 | 247 | 487 | 0.425 | 0.24 | 0.722 |
| 36.6 | 587 | 933 | 174 | 273 | 0.313 | 0.133 | 0.478 |

Figure 8:
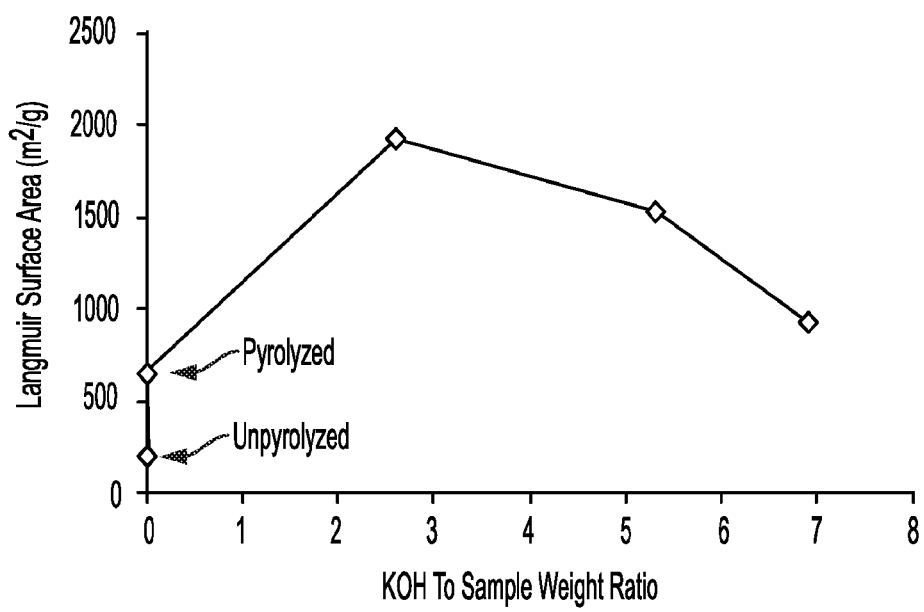
FIG. 8 shows the surface area as a function of the amount of KOH taken up by the sample during activation for pyrolized and unpyrolized samples.

The Langmuir surface area was increased to a maximum of 1933 m2/g with the lowest level of activation treatment, and further increases resulted in decreased surface area as can be seen in FIG. 8.

Example 3

Silicon nanoparticles were purchased from US Research Nanomaterials, Inc. and made hydrophobic through surface treatment in a process in which the surface is capped through covalent bonds with hydrogen. Further treatment is possible, to functionalize the silicon surface further with alkanes or other hydrophobic components which have affinity for the oil phase, and to increase the oxidative stability of the surface. Such additional treatments have previously been described in the literature to suspend silicon nanoparticles in oil phases, although not for doing so within graphene oxide shells.

Figure 9:
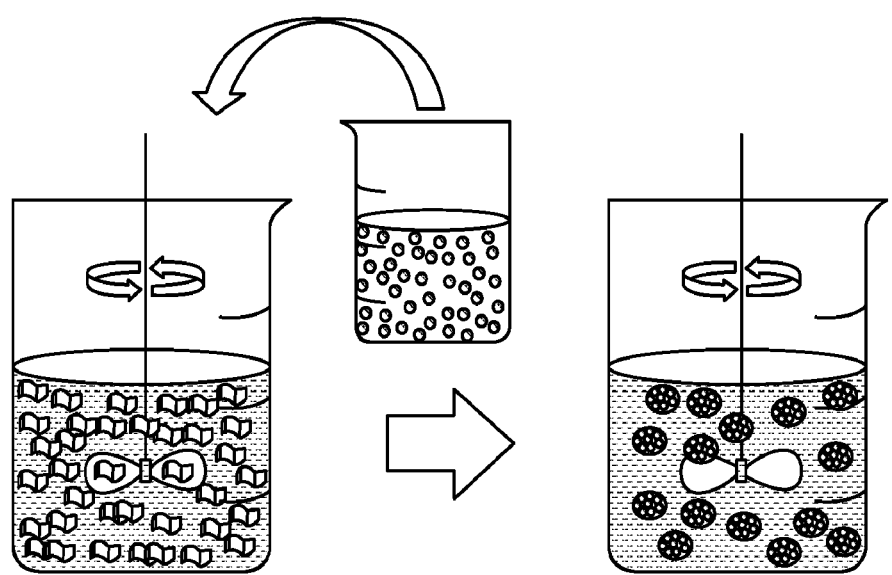
FIG. 9 shows the process of producing HGOM containing nanoparticles.

Naphthalene (or another suitable oil phase) was heated and the hydrogen terminated (Si—H), or alkane terminated, silicon nanoparticles was dispersed into the liquid naphthalene. A few minutes before the addition of the silicon nanoparticles, the silicon nanoparticles were air dried at 40 C to ensure no hexane was added to the naphthalene phase (and lower its melting point) and to facilitate accurate weights of the Si—H nanoparticles. An aqueous dispersion of graphene oxide was also heated and the naphthalene liquid containing the hydrophobic silicon nanoparticles was added. Energy to create an emulsion was added to create a fine oil-in-water type emulsion, consisting of the silicon nanoparticles containing droplets of naphthalene dispersed in the aqueous phase. Droplet size was controlled by applying different levels of shear, either through sonication, rotor-stator dispersing element, or high speed stirring of the crude emulsion. Upon cooling of the emulsion, the hybrid droplets of silicon nanoparticles and naphthalene solidified, the solid cores being wrapped in a shell of graphene oxide. The overall process is shown in FIG. 9. The hybrid core-shell particles were then washed with DDI upon a Buchner funnel to remove any additives, such as acetic acid, which may have been added to control the pH of the solution during emulsification.

An important consideration is the relative volume of silicon nanoparticles to the available space within the hollow graphene oxide membrane. Graphene oxide membranes (e.g., GO paper) shrink in the plane of the membrane 7.5% to 8% upon thermal reduction, which means that the internal volume may decrease by 20% upon thermal reduction. Additionally, the lithiated volume of the silicon is by some calculations (depending upon the final lithiation state) as much as 4.12 times the volume of the unlithiated state. Additionally, it should be expected that some pore volume remains about the silicon nanoparticles, increasing the space needed to accommodate the silicon without producing excessive forces on the membrane shells.

Two divergent paths were used after the silicon nanoparticle containing GO spheres were manufactured via steps described above.

Path A: In a 40 mL glass vial 0.013 grams of hydrogen caped silicon nanoparticles were added to 0.38 grams of naphthalene and the naphthalene was melted to wet the silicon nanoparticles. To the naphthalene wetted silicon nanoparticles, 0.76 grams of 1.32 wt % graphene oxide suspension, 18.64 mL of DDI water, and 0.60 g of acetic acid were added and heated to 100 C and sonicated at 45 W for 2 minutes, with the final temperature of the mixture at the end of sonication at the boiling point (100 C). The capped vial was cooled under running water, the suspension filtered on a 0.2 micron nylon filter, and washed with an additional 10 mL of DDI water, to remove any remaining acetic acid. The naphthalene cored spheres were removed from the filter membrane and mixed with 0.76 mL of 1.32 wt % graphene oxide suspension. One third of the mixture was refiltered on a 0.2 micron nylon membrane and the composite 'paper' was carefully removed from the membrane with forceps.

Path B: As an alternate path to Path A, a Resocricnol-formaldehyde (RF) type composite containing silicon nanoparticles was made. The HGOM hybrid core-shell particles were incorporated into hierarchical structures as described above.

The composite(s) formed in were thermally reduced at 700 C under high purity argon at a flow rate of 100 mL per minute to produce an electrically conductive graphene/graphitic matrix about the silicon nanoparticles.

The thermally reduced composite was transferred to an argon filled glove box or glove bag for assembly either into a 2016 coin cell with lithium counter electrode or assembly into to a Swagelok cell with lithium counter electrode, using a microporous membrane separator (Celgard 2325) or a binderless micro-fiber fiberglass separator, and 1.0 M LiPF6 in 1:1 volume ethylene carbonate: dimethyl carbonate electrolyte.

Figure 10:
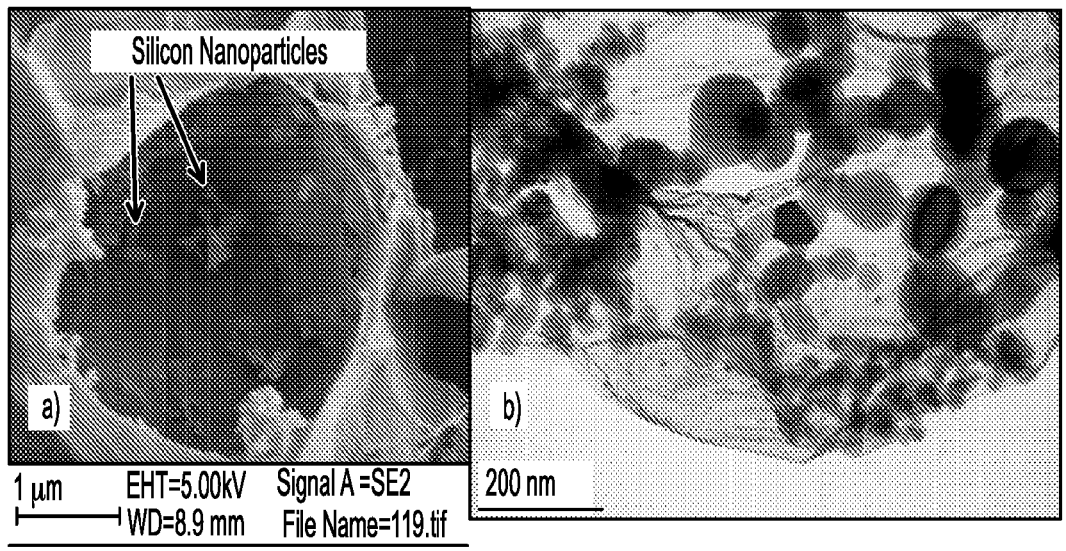
FIG. 10 shows silicon nanoparticles were encapsulated into the HGOM particles.

Silicon nanoparticles were successfully placed within the naphthalene cores. The naphthalene cores were sublimed yielding a graphene oxide and silicon nanoparticles composite shown in FIG. 10 depicting a scanning electron microscopy (A) and a transmission electron microscopy (TEM) image (B). the transmission electron microscopy (TEM) images. By adding silicon nanoparticles to these thin shells results in a high loading of silicon. Without any resorcinol-formaldehyde (RF) added, this formulation produced a 90% silicon anode when thermally reduced at 700° C. In practice this is a higher ratio than needed to produce anodes of exceptionally high capacity and more buffering (for strength and volumetric expansion during lithiation of the silicon) can be accomplished by increasing the graphene oxide content.

Under these conditions, the TEM images show silicon nanoparticles, approximately 30 to 80 nm in size, encapsulated in graphene oxide shell membranes which are approximately 5 microns in diameter. The graphene oxide platelets provided mechanical linkage between the spheres. For this system (Path A), no polymer binder or conductive additive was added, since the reduced graphene oxide serves both purposes. Upon thermal reduction the graphene oxide yielded a free standing network of highly electrically conductive carbon and graphitic phases, with the silicon nanoparticles in intimate electrical contact throughout the electrode. Some areas in the lower SEM image were collapsed beyond the resolution of the SEM image and appeared as more or less solid bands.

This desired state allows for flexibility of the graphene oxide shells, which are then compressed but remain intact and flexible for expansion and contraction about the silicon nanoparticles as the battery is cycled. By controlling the emulsion parameters and adding higher levels of silicon nanoparticles and graphene oxide per the shell volume fine (approx. 500 nm diameter) graphene oxide membrane particles with encapsulated silicon nanoparticles were produced. This reduced shell diameter has the potential to further limit the potential for aggregation within each shell. After additional graphene oxide was added (following the general steps in Experimental Path A outlined previously), an unreduced sample was produced which is approximately 30% silicon and 70% graphene oxide.

Figure 11:
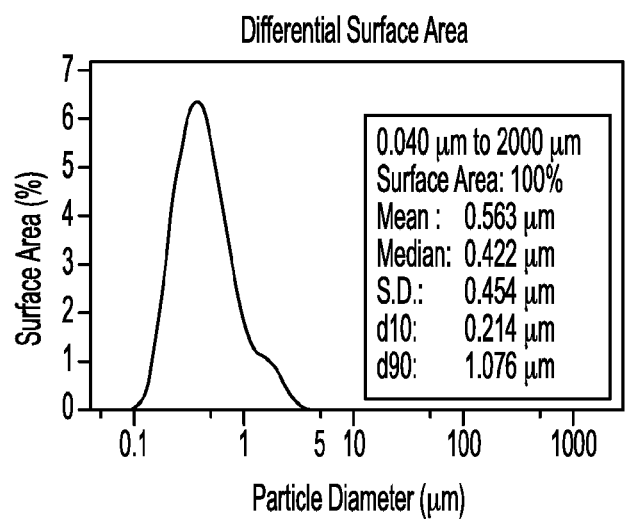
FIG. 11 shows size distribution of the hollow graphene oxide membranes which are filled with silicon nanoparticles.

The aggregation of silicon nanoparticles across different graphene sacks may be prohibited by the enclosing membranes. It has been demonstrated silicon nanoparticle encapsulated graphene oxide shells are less than 1.0 micron, much smaller than the size of red blood cells. FIG. 11 shows the size distribution of the hollow graphene oxide membranes based on relative surface area, since this is an important parameter in designing and calculating the resulting shell thickness.

The XRD pattern for the unpyrolyzed sample showed the GO stacking peak (002) at 12.4 degrees, corresponding to approximately 7.1 angstroms, and is indicative of the interlayer spacing of the graphene oxide sheets. The membrane shells of the graphene oxide spheres, although they appear to be well defined in TEM images, are thin and therefore may produce a weaker GO 002 XRD peak than might otherwise be expected.

The peak at 26 degrees (3.4 angstroms) of the pyrolyzed sample corresponds to the interlayer spacing of graphite, and it can be inferred that the material becomes somewhat graphitic in nature as thermal reduction occurs, since the peak is absent in the unreduced sample, but except for the silicon peaks is dominant in the pyrolyzed sample. The graphene/graphene oxide peak at 42 degrees (100) has been described in the literature for graphene oxide and reduced graphene oxide. The diffraction peaks at 28 and 47 degrees are typical of silicon (111) and (220), respectively and are an indication that the silicon is crystalline and has not been oxidized under the processing conditions. The labeling of the diffraction pattern peaks for graphene and graphene oxide follows the assignments from Physics and Applications of Graphene—Experiments.

The Scherrer equation yields an approximate silicon crystallite size of ~20 nm, using a shape factor of 0.9 based on the equation for full width at half maximum (FWHM) of the silicon 111 and 220 peaks. No broadening of the peaks was observed in the pyrolyzed sample. Many of the silicon particles are on the order of ~20 nm, however the TEM images reveal that there are many 80 nm diameter particles as well. It is possible that the nanoparticles contain more than one crystallite domain, and that the domain size is on the order of 20 nm. However, it should be remembered that since there are experimental causes of line broadening, the Scherrer equation fundamentally only sets a bound on the minimum size of the crystallite domains.

Figure 12:
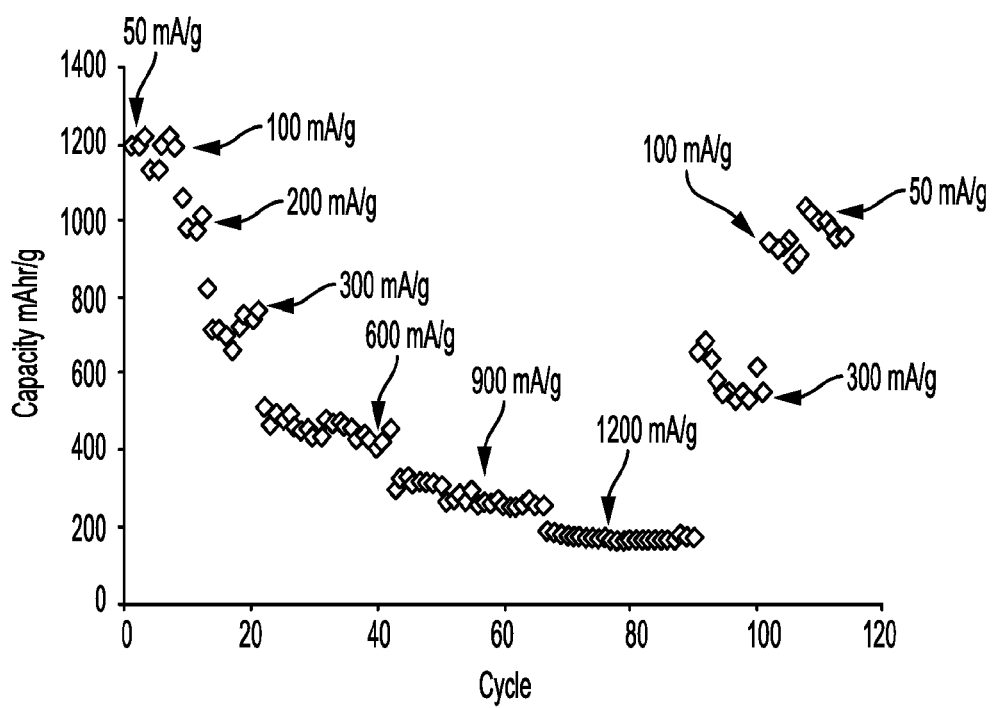
FIG. 12 shows the discharge capacity of a 50% HGOM-Si anode as a function of cycle number for various rates of discharge. This anode was charged at the same charge rate indicated by the numbers in the figure.

The HGOM-Si anode material was assembled in a test cell and repetitively charged and discharged on a battery analyzer. In FIG. 12, it can be observed that when the rate of charge is increased, the total charge (capacity) in the anode decreases. After 90 cycles, the rate of charge was reduced on the anode and the total charge reversed its behavior, increasing again; however as the rate of charge was decreased to the original value of 50 mA/g, the capacity of the anode nearly achieved its initial value, i.e., some small charge capacity was lost.

Figure 13:
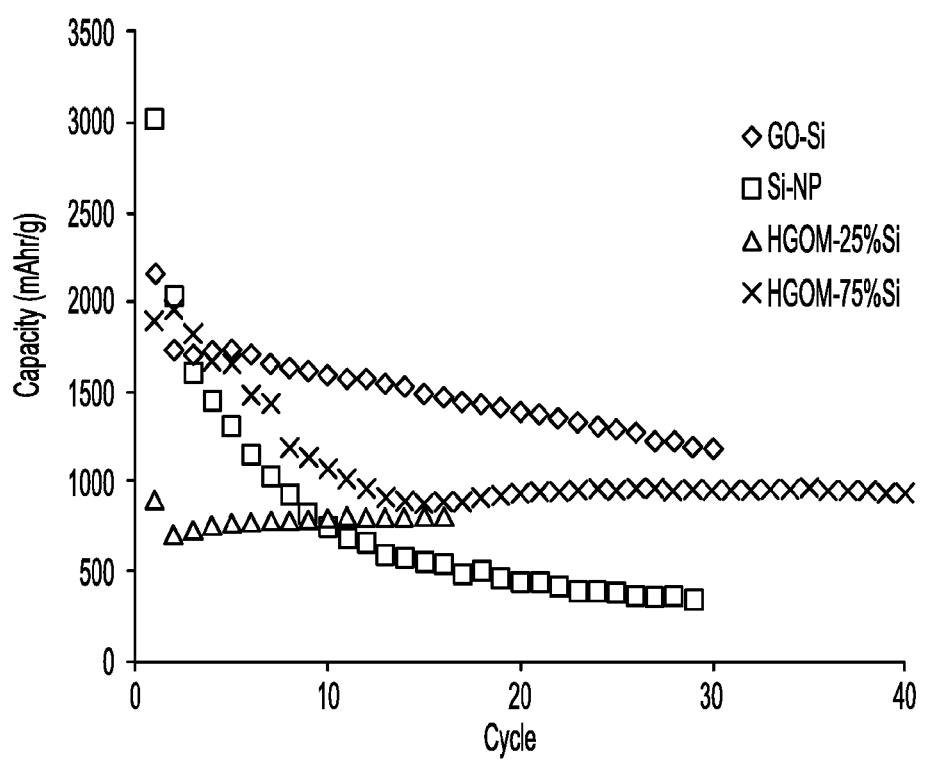
FIG. 13 shows the comparison of HGOM-enclosed nanoparticles of the present invention with 25 and 75 percent of Silicon with simple admixture of GO and Silicon and/or single silicon nanoparticles.

FIG. 13 shows the comparison of HGOM-enclosed nanoparticles of the present invention with simple admixture of GO and Silicon nanoparticles. Relative rapid fading occurs in the first 30 cycles with this simple technique. It is evident from the figure that data from the simple admixture starts off at a high value of the charging capacity; however, it shows a steady decrease. The Si—NP curve also has a high starting value but it goes down quite abruptly reaching 400 mAhr/g. Anodes made with nano-particles of the present invention (HGOM-75% Si) show a promising trend starting off at high value and decreasing up to 1000 mAhr/g with a remarkable stability after 20 cycles.

Figure 14:
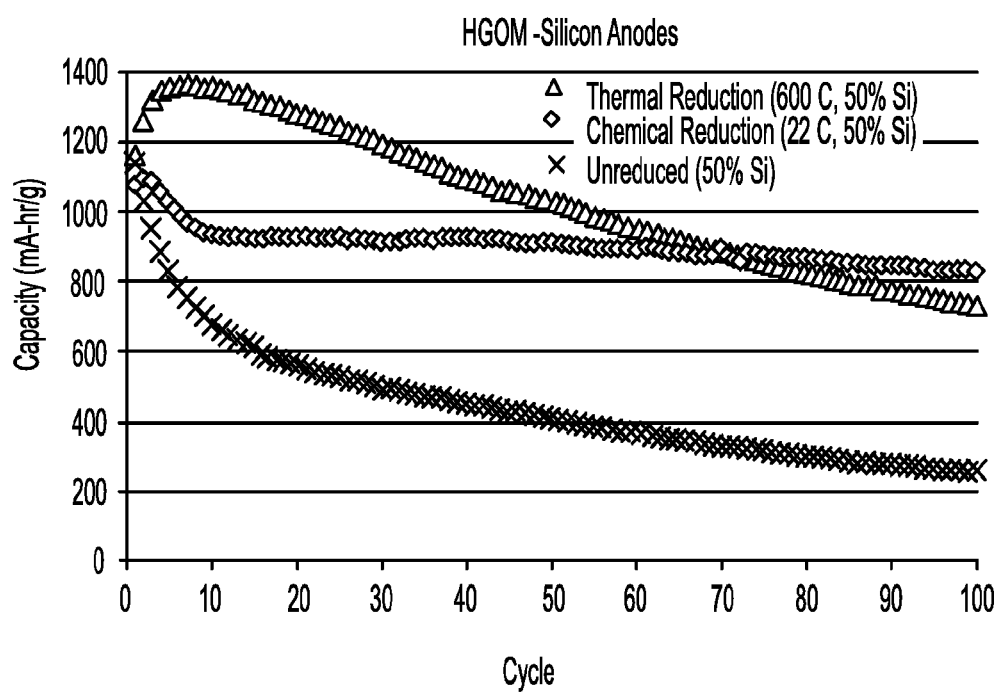
FIG. 14 shows the capacity discharge as a function of cycle number for different HGOM silicon anodes fabricated with different methods (Thermally reduced, chemically reduced and Unreduced).
Figure 15:
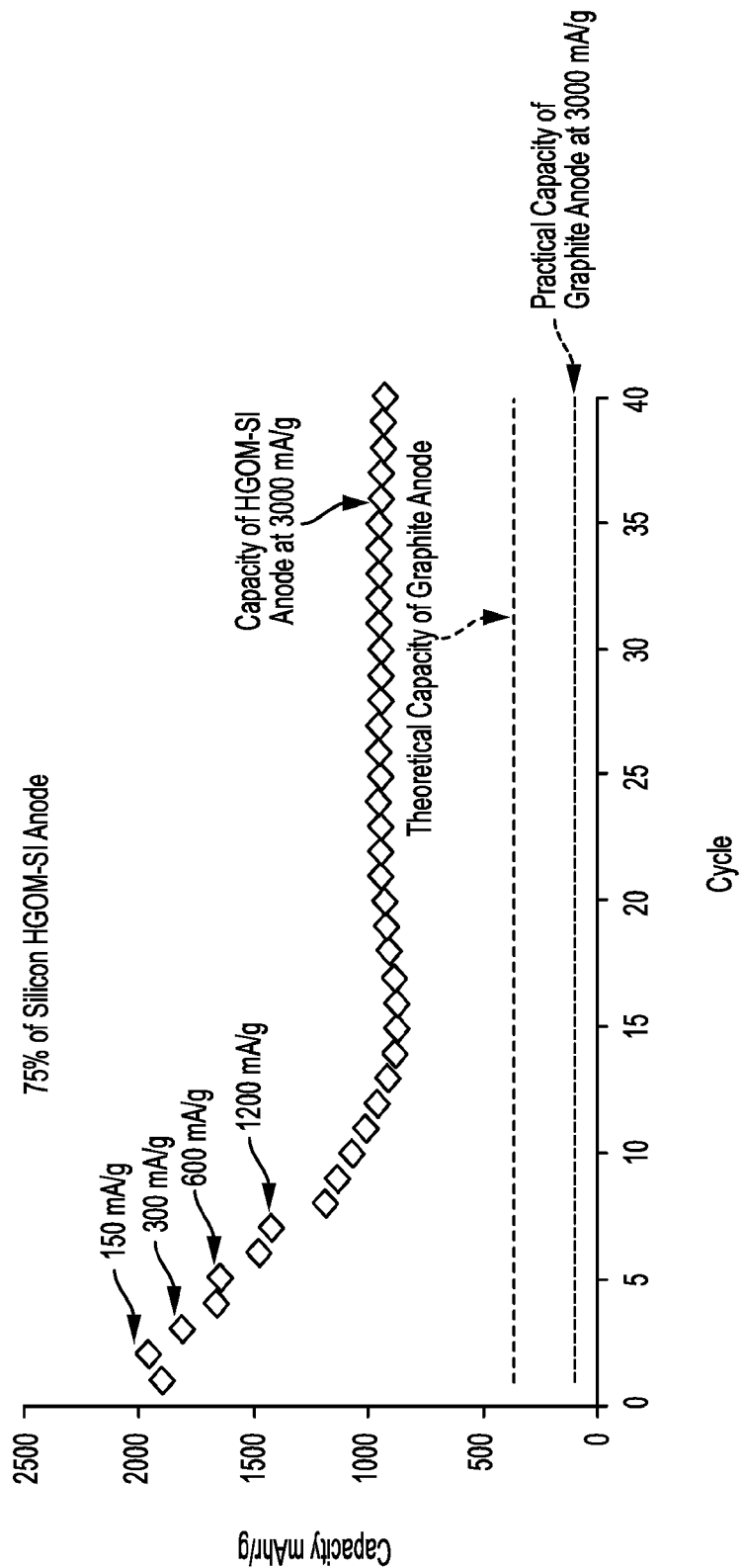
FIG. 15 shows the comparison of capacity of different graphite anodes. Blue curve: Discharge capacity of a thermally reduced 75% HGOM-Si anode with different discharge rates indicated with arrows (from 150 mgA/g to 3000 mgA/g in the plateau region). Green curve: Theoretical capacity of Graphite anode. Red curve: Practical capacity of Graphite anode and 3000 mA/g.
Figure 16:
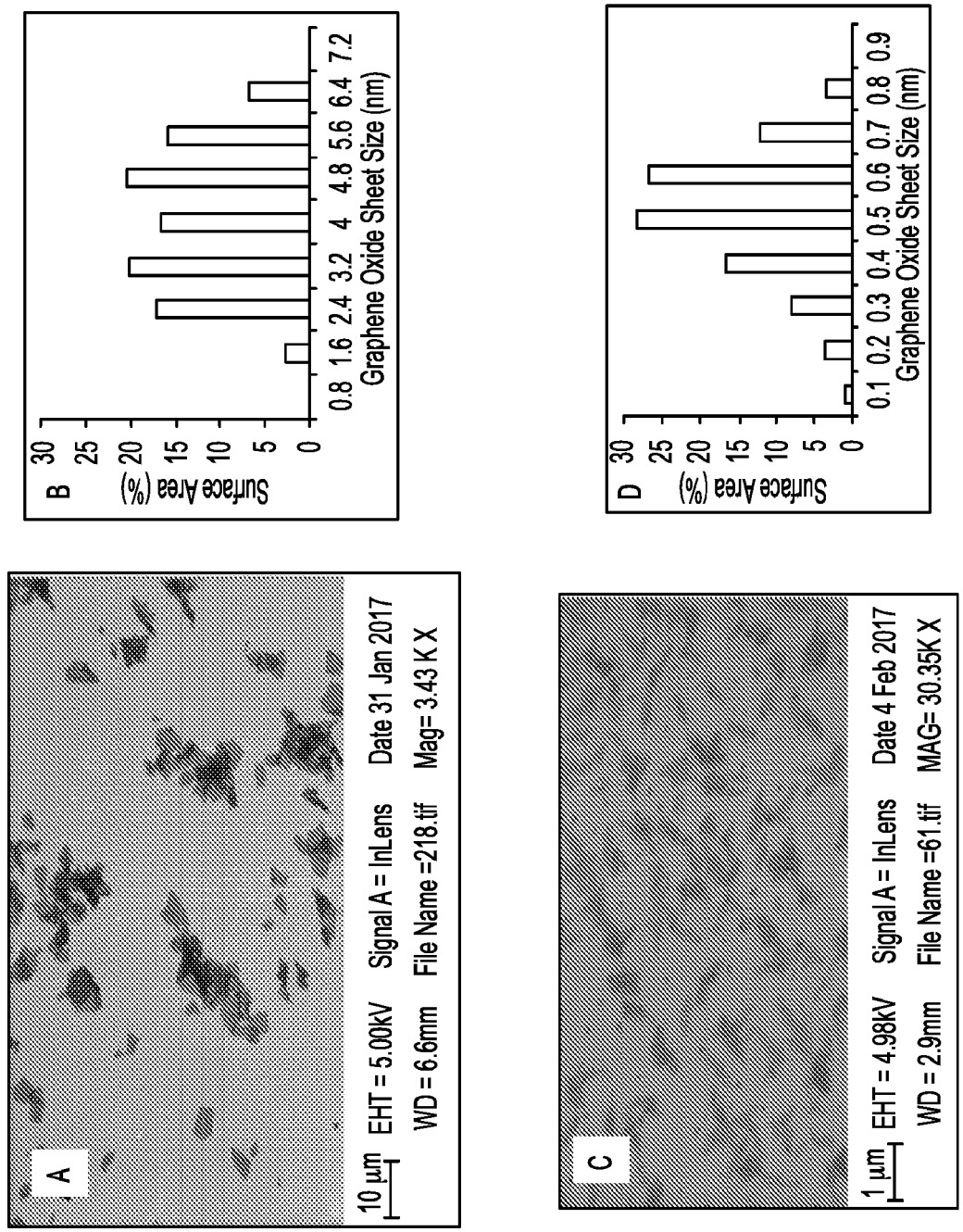
FIG. 16 shows HGOM prepared from different GO sheets.

FIG. 14 shows anodes made with chemical reduction, thermal reduction, and unreduced HGOM-silicon anodes. The anode made through chemical reduction with hydrazine vapor with 50% silicon has increased stability, especially after the first 10 cycles. The chemically reduced anode was cycled at a constant current charge and discharge rate of 300 mA/g and retained a capacity above 800 mAhr/g at 100 cycles as shown in FIG. 15. The discharge capacity of a thermally reduced 75% HGOM-Si anode with different discharge rates indicated with arrows (from 150 mgA/g to 3000 mgA/g in the plateau region). The green curve in FIG. 15 shows the theoretical capacity of Graphite anode and the red curve depicts the practical capacity of Graphite anode and 3000 mA/g. Notice in this figure that our HGOM-Si1 anodes have a much higher capacity when cycled at very high charge and discharge rates (3000 mA/g) compared to graphite anodes, which are the most common anodes in the market at the same discharge rate of 3000 mA/g."

Example 4

The size of the GO sheets used to make HGOM particles impacts the resulting surface area. As shown in FIGS. 10(A) and 10(B), the surface area varies depends on the GO sheet size when a rotor-stator was used. FIGS. 10(C) and 10(C) illustrates the change in the surface area varies according to the GO sheet size when sonication was used.

It will be understood by those of skill in the art that numerous and various modifications can be made without departing from the spirit of the present invention. Therefore, it should be understood that the various embodiments of the present invention described herein are illustrative only and not intended to limit the scope of the present invention.

The invention claimed is:

1. A method of producing graphene oxide shells comprising:
   (a) admixing an organic removable substance in an aqueous solution, wherein said removable substance comprises naphthalene, 9-fluorenone, or paraffin, and said aqueous solution contains graphene oxide;
   (b) emulsifying said aqueous solution to form graphene oxide shells coating said removable substance; and
   (c) removing said removable substance from said shells.

2. The method of claim 1, wherein the ratio between said removable substance and said graphene oxide is from about 500:1 to about 50:1 by weight.

3. The method of claim 1, wherein said removable substance is a solid at room temperature and said solution of step (b) is maintained at a temperature above the melting point of said removable substance.

4. The method of claim 3, wherein said temperature is controlled at between about 90° C. to 100° C.

5. The method of claim 1, further comprising cooling said removable substance to a temperature below its melting point after step (b); and wherein step (c) comprises removing said substance by sublimation.

6. The method of claim 1, wherein said graphene oxide of step (a) has a concentration ranging from about 20 ppm to about 5000 ppm.

7. The method of claim 1, wherein said graphene oxide of step (a) has a concentration ranging from about 40 ppm to about 4000 ppm.

8. The method of claim 1, wherein said graphene oxide is obtained from graphene oxide sheets having a lateral mean size of between about 0.5 μm to about 4 μm.

9. The method of claim 1, wherein said aqueous solution has a pH between about 1 and about 5 in step (b).

10. The method of claim 1, wherein the emulsifying step is promoted by a rotor at a shear rate of between about 1,000 to about 50,000 rpm.

11. The method of claim 1, wherein the emulsifying step is promoted by sonication.

12. The method of claim 1, further comprising mixing said graphene oxide shells with an aerogel matrix material and forming a matrix holding the shells together.

13. The method claim 12, wherein said aerogel matrix material comprises resorcinol formaldehyde (RF).

14. The method of claim 1, wherein said removable substance is admixed with nanoparticles and said emulsifying step (b) coats said nanoparticles with graphene oxide shells.

15. A graphene oxide shell produced according to the method of claim 1.

16. The method of claim 1, wherein said removable substance comprises naphthalene.

* * * * *